(12) United States Patent
Kanemoto

(10) Patent No.: US 11,831,836 B2
(45) Date of Patent: Nov. 28, 2023

(54) INFORMATION PROCESSING APPARATUS AND CONTROL METHOD OF INFORMATION PROCESSING APPARATUS FOR CHANGING DISPLAY MODE OF ICON ON BASIS OF STATUS OF IMAGE FORMING DEVICE

(71) Applicant: SHARP KABUSHIKI KAISHA, Sakai (JP)

(72) Inventor: Yuhko Kanemoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/463,962

(22) Filed: Sep. 1, 2021

(65) Prior Publication Data

US 2022/0070331 A1 Mar. 3, 2022

(30) Foreign Application Priority Data

Sep. 1, 2020 (JP) ................................ 2020-147112

(51) Int. Cl.
*H04N 1/327* (2006.01)
*H04N 1/00* (2006.01)

(52) U.S. Cl.
CPC ..... *H04N 1/32745* (2013.01); *H04N 1/00225* (2013.01); *H04N 1/00424* (2013.01); *H04N 1/00427* (2013.01); *H04N 1/00941* (2013.01)

(58) Field of Classification Search
CPC .......... H04N 1/00408; H04N 1/00424; H04N 1/00427; H04N 1/00307; H04N 2201/0075; H04N 1/32745; H04N 1/00225; H04N 1/00941; H04N 1/00278; H04N 2201/0094; G06F 3/126; G06F 3/1268; G06F 3/1269; G06F 3/1255; G06F 3/1292
USPC ....................................... 358/1.15
See application file for complete search history.

(56) References Cited

U.S. PATENT DOCUMENTS

| | | | |
|---|---|---|---|
| 8,576,422 B2 | 11/2013 | Kimura et al. | |
| 8,810,662 B2 | 8/2014 | Okamoto et al. | |
| 2010/0067035 A1 | 3/2010 | Kawakubo et al. | |
| 2010/0171973 A1 | 7/2010 | Kimura et al. | |
| 2011/0063668 A1* | 3/2011 | Shirai | G06F 3/1204 358/1.15 |
| 2012/0182432 A1 | 7/2012 | Okamoto et al. | |
| 2015/0116760 A1* | 4/2015 | Kim | H04N 1/00503 358/1.15 |
| 2015/0172505 A1* | 6/2015 | Park | H04N 1/00307 358/1.15 |

(Continued)

FOREIGN PATENT DOCUMENTS

| | | |
|---|---|---|
| CN | 101770351 A | 7/2010 |
| CN | 102595017 A | 7/2012 |

(Continued)

*Primary Examiner* — Kent Yip
(74) *Attorney, Agent, or Firm* — ScienBiziP, P.C.

(57) ABSTRACT

The present invention includes: a receiver that receives posting of a message including a request by a user; a poster that posts the message received by the receiver to a social networking service (SNS); an acquirer that acquires a message posted by an image forming device from the SNS, the image forming device being able to process the request and being among image forming devices that are associated with the user in the SNS; and a display that shows the message acquired by the acquirer.

7 Claims, 26 Drawing Sheets

(56) References Cited

U.S. PATENT DOCUMENTS

2019/0258431 A1\* 8/2019 Yamamoto ............ G06F 3/1268
2020/0099799 A1\* 3/2020 Obayashi .............. G06F 3/1258
2020/0304437 A1\* 9/2020 Sasamae ................ H04L 51/02

FOREIGN PATENT DOCUMENTS

CN 110908617 A 3/2020
JP 2010-072756 A 4/2010

\* cited by examiner

FIG. 3

| GROUP ID | GROUP NAME | ACCOUNT NAME |
|---|---|---|
| ROOM-A | MFP Group | suzuki, mx6060, mx3050, mx360, mx60 |
| ROOM-B | MEETING ROOM RESERVATION Group | suzuki, tanaka, meeting01, meeting02 |
| ⋮ | ⋮ | ⋮ |

FIG. 4

| POSTER INFORMATION | DESTINATION INFORMATION | POSTED DATE/ TIME | MESSAGE |
|---|---|---|---|
| suzuki | ROOM-A | 2020/05/25 12:00:00 | A4, DOUBLE-SIDED, STAPLE |
| mx6060 | ROOM-A | 2020/05/25 12:00:03 | PRINTER READY! |
| mx3050 | ROOM-A | 2020/05/25 12:00:03 | PRINTER READY! |
| suzuki | ROOM-A | 2020/05/25 12:00:28 | 3050 |
| ⋮ | ⋮ | ⋮ | ⋮ |

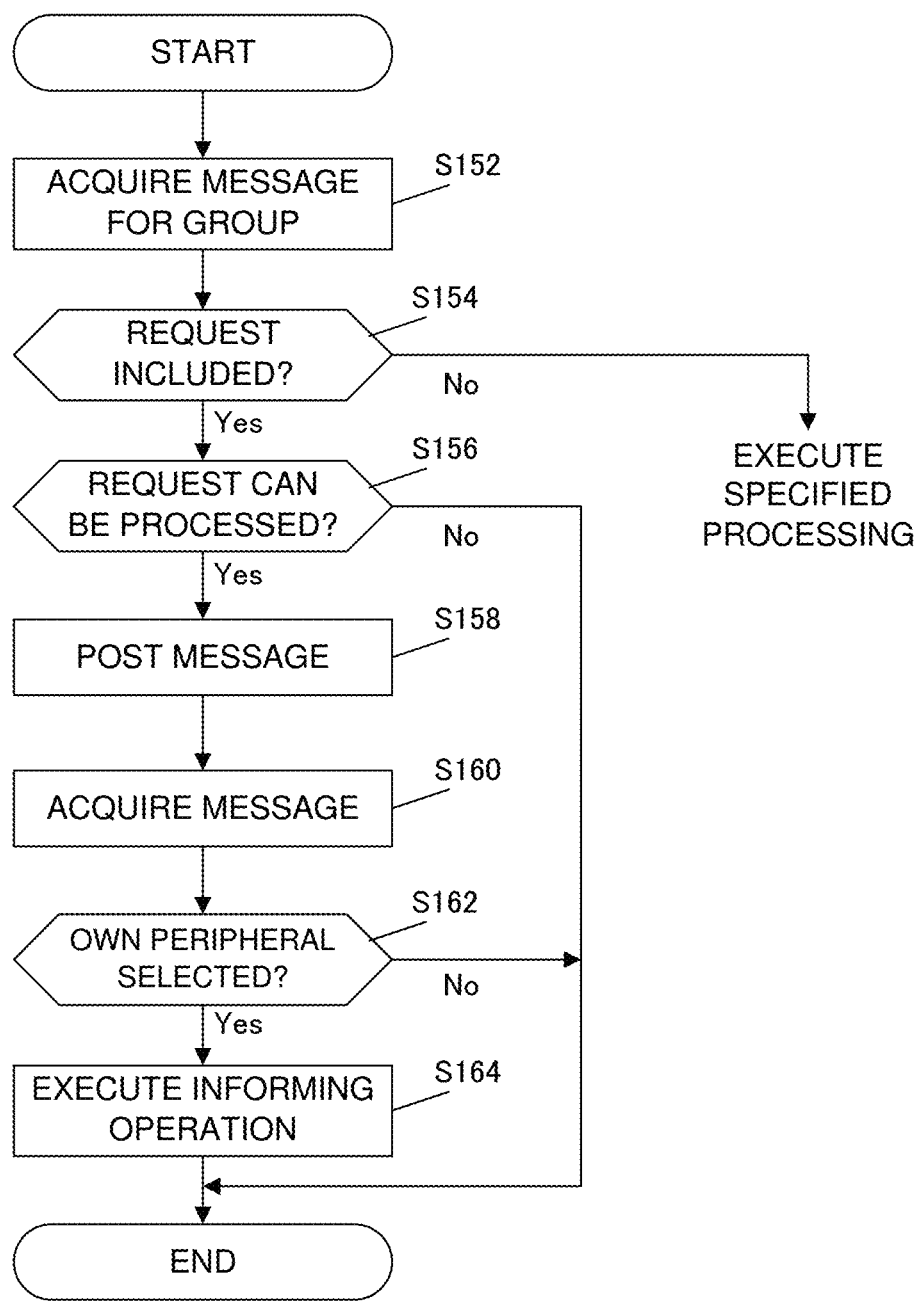

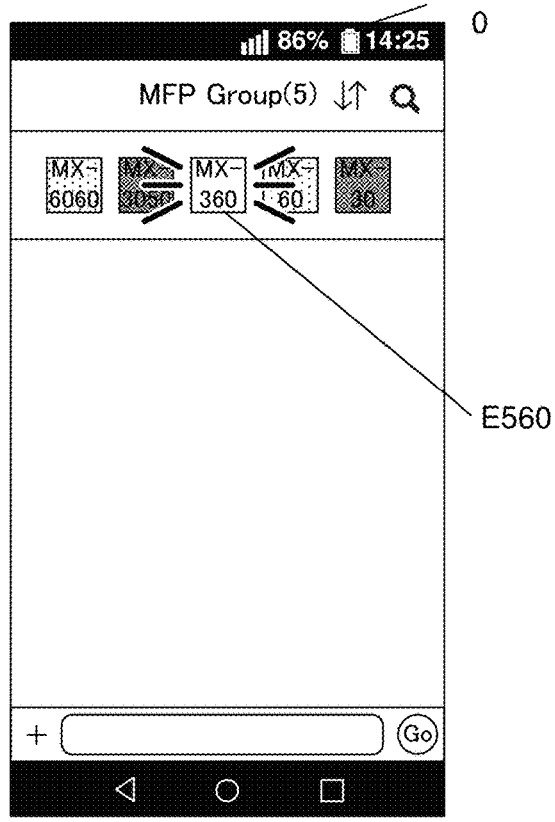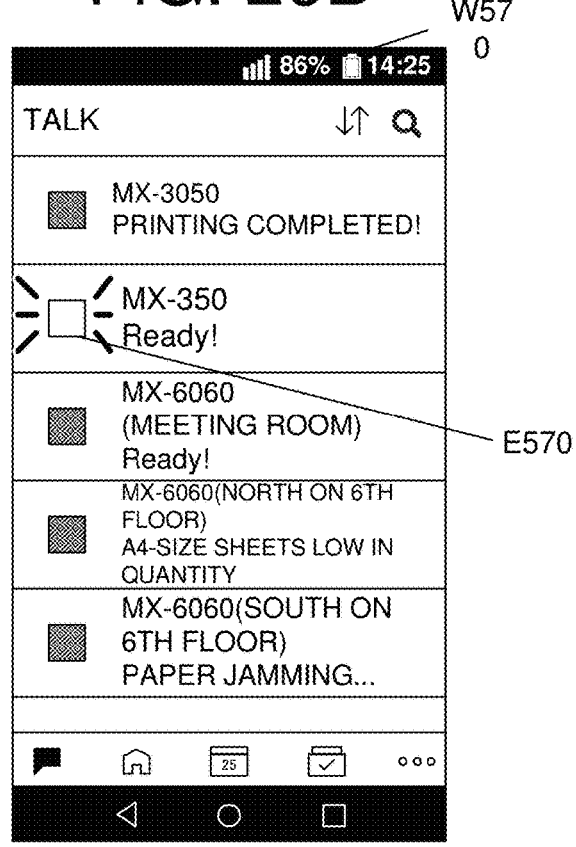

INFORMATION PROCESSING APPARATUS AND CONTROL METHOD OF INFORMATION PROCESSING APPARATUS FOR CHANGING DISPLAY MODE OF ICON ON BASIS OF STATUS OF IMAGE FORMING DEVICE

BACKGROUND OF THE INVENTION

Field of the Invention

The present invention relates to an information processing apparatus and the like.

Description of the Background Art

Conventionally, such an invention has been known that allows a user to easily acknowledge a device implementing a function desired by the user.

For example, the following technique is disclosed in Japanese Unexamined Patent Application Publication No. 2010-72756. When the user right-clicks an application icon on an application list screen of a client PC that is connected to an image forming device via a network, information on the image forming device that can use the application is displayed.

Recently, a technique has been proposed that uses an application on a smartphone to exchange messages (talk) with the image forming device, so as to cause the image forming device to print a photograph or text in the smartphone or to send scanned data to the smartphone. However, only one image forming device can be set as a message exchanging target, and the screen must be switched to exchange the messages with plural image forming devices. In addition, even when the plural image forming devices are registered as message destinations, it is difficult to select the image forming device that implements the desired function without prior understanding of the functions provided by the image forming devices. Such a problem is not considered in Japanese Unexamined Patent Application Publication No. 2010-72756.

In view of the above-described problem, the present application has a purpose providing an information processing apparatus and the like capable of showing a message that is posted by a device capable of processing a user's request.

SUMMARY OF THE INVENTION

In order to solve the above-described problem, the present disclosure relates to an information processor that includes: a receiver that receives posting of a message including a request by a user; a poster that posts the message received by the receiver to a social networking service (SNS); an acquirer that acquires a message posted by an image forming device from the SNS, the image forming device being able to process the request and being among image forming devices that are associated with the user in the SNS; and a display that shows the message acquired by the acquirer.

The present disclosure relates to an information processor that includes: a receiver that receives posting of a message including a request by a user, the message being addressed to a specified image forming device among image forming devices that are associated with the user in a social networking service (SNS); a poster that posts the message, which is received by the receiver and addressed to the specified image forming device, to the SNS; an acquirer that acquires a message posted by the specified image forming device from the SNS, the message indicating the image forming device capable of processing the request; and a display that shows the message acquired by the acquirer.

The present disclosure relates to a control method of an information processing apparatus, which includes: receiving posting of a message including a request by a user; posting the received message to a social networking service (SNS); acquiring a message posted by an image forming device from the SNS, the image forming device being able to process the request and being among image forming devices that are associated with the user in the SNS; and showing the acquired message.

The present disclosure relates to a control method of an information processing apparatus, which includes: receiving posting of a message including a request by a user, the message being addressed to a specified image forming device among image forming devices that are associated with the user in a social networking service (SNS); posting the received message, which is addressed to the specified image forming device, to the SNS; acquiring a message posted by the specified image forming device from the SNS, the message indicating the image forming device capable of processing the request; and showing the acquired message.

According to the present disclosure, it is possible to show the message that is posted by the processor capable of processing the user's request.

BRIEF DESCRIPTION OF THE DRAWINGS

FIG. 3 is a table illustrating an example of a data structure of group data in the first embodiment.

FIG. 4 is a table illustrating an example of a data structure of message data in the first embodiment.

FIG. 8 is a flowchart for illustrating a flow of main processing by a multi-function peripheral in the first embodiment.

FIGS. 26A to 26B include views for illustrating the operation example in the fourth embodiment.

DESCRIPTION OF THE PREFERRED EMBODIMENTS

A description will hereinafter be made on an embodiment of a printing system including a terminal device, to which an information processing apparatus according to the present disclosure is applied. Each of the embodiments will be described for convenience of describing the present invention, and the technical scope of the present invention is not limited to the following embodiments.

1. First Embodiment 1.1 Overall Configuration

Figure 1:
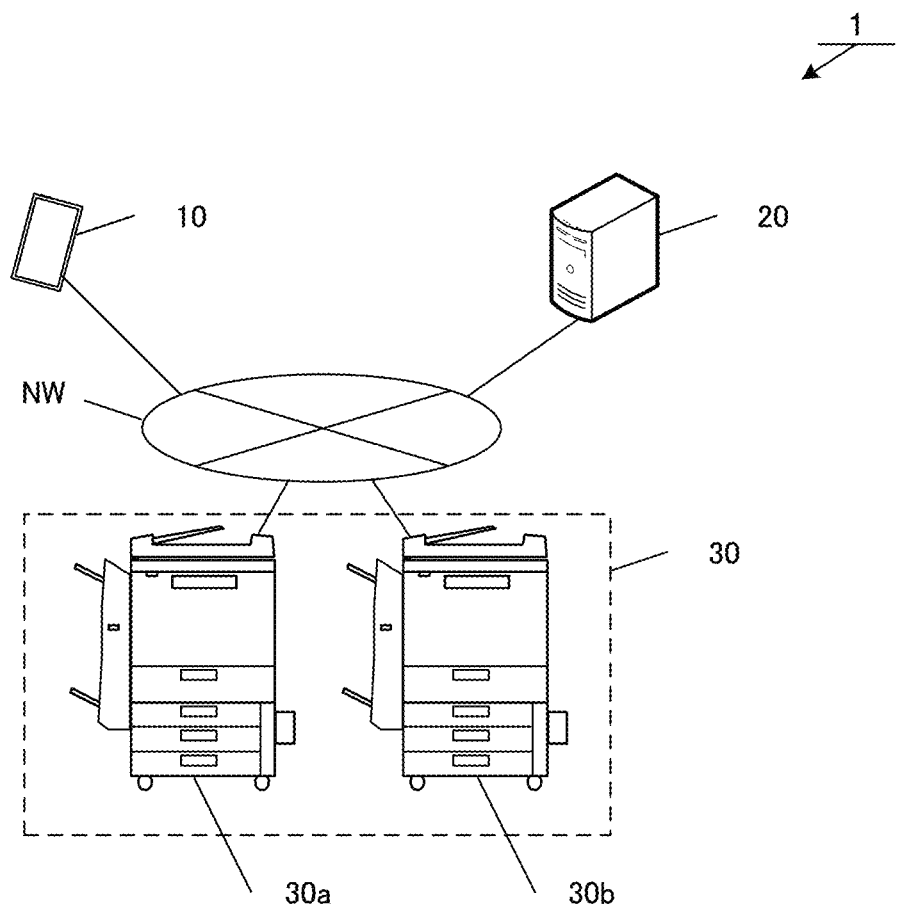
FIG. 1 is a view for illustrating an overall configuration of a printing system in a first embodiment.

FIG. 1 is a schematic view for illustrating an entire printing system 1. In the printing system 1, a terminal device 10, a message server 20, and a multi-function peripheral 30 are connected via a network NW.

The message server 20 is a server device that provides a specified service. In the present embodiment, the message server 20 provides a social networking service (SNS). The SNS may be provided by the plural message servers 20.

The message server 20 provides, as a function of the SNS, a function (a talk function, a messaging service) of exchanging a message with a device used by a user or a device (a chatbot or a bot) that has a dialogue with the user. In the present embodiment, posting means sending a message to the message server 20. A message is a content (for example, text data, a voice, an icon image, handwritten characters, a function button of an application, a gesture, or the like) intended to be acquired by the user or the device.

The terminal device 10 is a device that is used by the user of the SNS provided by the message server 20, and is an information processing apparatus that is constructed of a mobile terminal, such as a smartphone or a tablet computer, or a personal computer (PC), for example.

The multi-function peripheral 30 is an image forming device (a printer) that has a function of forming an image on a recording medium (for example, recording paper) to output (print) the image. The multi-function peripheral 30 is a multi-function printer/peripheral (MFP) that is installed in a convenience store and is capable of printing and scanning, for example. As illustrated as multi-function peripherals 30a, 30b in FIG. 1, the plural multi-function peripherals 30 may be connected to the network NW.

The network NW is a network that connects the devices. For example, the network NW is realized by a local area network (LAN) or a wide area network (WAN). Alternatively, the network NW may be configured by combining these networks.

1.2 Functional Configuration 1.2.1 Terminal Device

Figure 2:
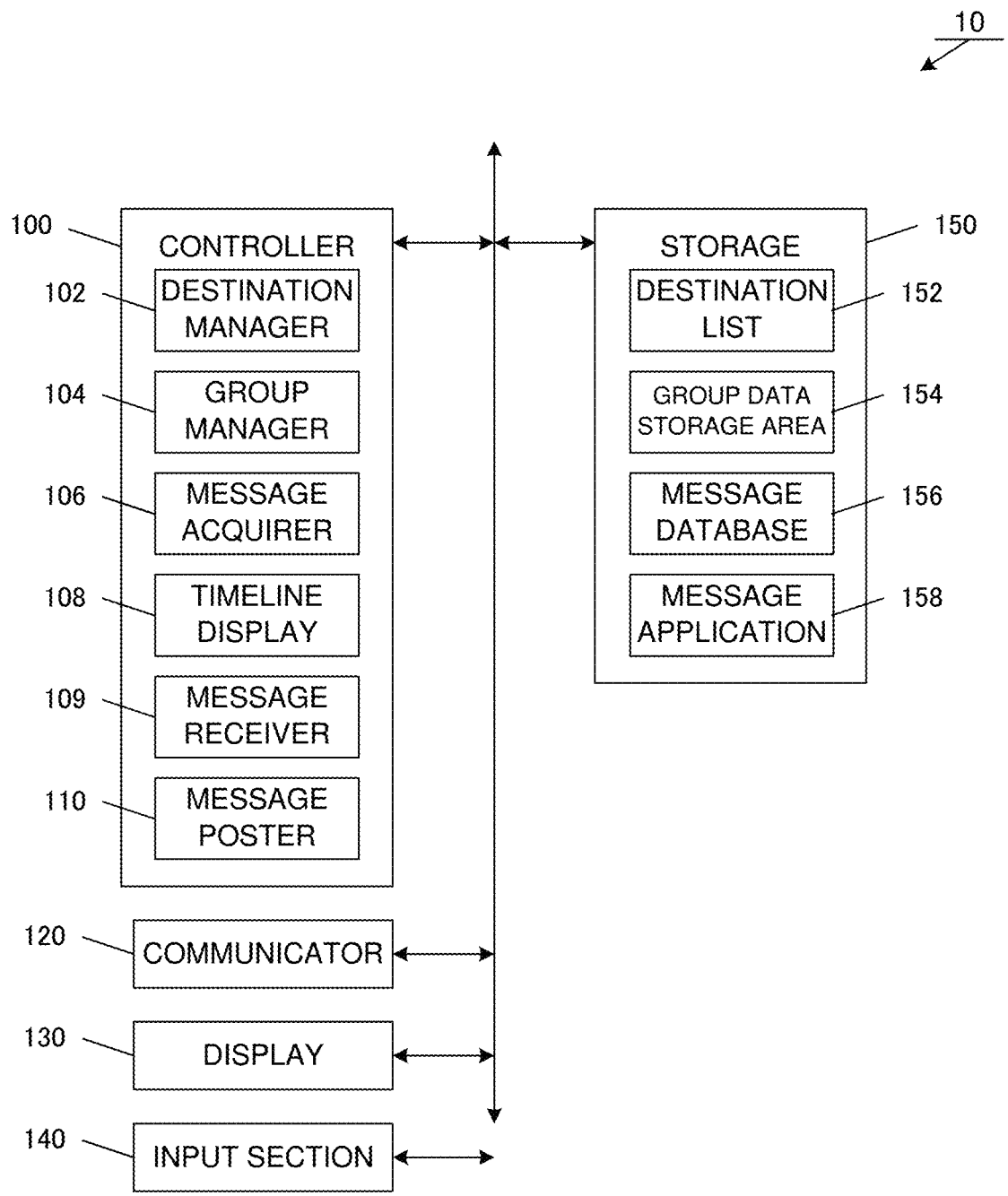
FIG. 2 is a diagram for illustrating a functional configuration of a terminal device in the first embodiment.

A description will be made on a functional configuration of the terminal device 10 with reference to FIG. 2. As illustrated in FIG. 2, the terminal device 10 is configured to include a controller 100, a communicator 120, a display 130, an input section 140, and a storage 150.

The controller 100 is a functional device that controls the entire terminal device 10. The controller 100 implements various functions by reading and executing various programs that are stored in the storage 150. The controller 100 is constructed of one or plural arithmetic devices (for example, central processing units (CPUs)), for example.

When executing the programs, the controller 100 functions as a destination manager 102, a group manager 104, a message acquirer 106, a timeline display 108, a message receiver 109, and a message poster 110.

The destination manager 102 manages information on a destination of the message that can be specified by a user who uses the terminal device 10. The destination of the message that can be specified by the user is information used to identify an account of another user or another device that is mutually associated with an account of the user who uses the terminal device 10 in the SNS provided by the message server 20.

In the present embodiment, a description will be made that the information used to identify the account of the user or the device will be an account name and that the message destination will be identified by the account name. However, the information used to identify the account of the user or the device may be a character string in a specified format, a sequential number, an email address, or the like.

In the present embodiment, the message server 20 associates the accounts of the users and devices using the SNS with each other. In addition, in the present embodiment, the mutually-associated users and devices will be referred to as "friends". In other words, the message server 20 allows an exchange of the message between the users and/or the devices corresponding to the accounts that have become friends. The device that is connected to the message server 20 can acquire, from the message server 20, the message posted by the account as the friend of the account corresponding to such a device.

In the case where the user performs an operation to become friends with another user or another device, the destination manager 102 uses an application programming interface (API) or the like that is provided by the message server 20, so as to send, to the message server 20, required information to become friends with another user or another device. The required information to become friends with another user or another device is the account name of the user who uses the terminal device 10 and the account name of another user or another device, for example. In the case where the message server 20 mutually associates the user who uses the terminal device 10 and another user or another device, the destination manager 102 adds the account name of another user or another device to a destination list 152.

The group manager 104 manages information on a group. A group means a relationship including three or more users or devices that use the SNS provided by the message server 20 to share the message.

In the case where the user performs an operation to select the friend or an operation to create the group, the group manager 104 uses the API or the like that is provided by the message server 20, so as to send, to the message server 20, required information to create the group. The required information to create the group is the account name of the user or the device that will belong to the group or a group name. In the case where the message server 20 associates, as the group, the user who uses the terminal device 10 and the friend selected by the user, the group manager 104 stores information on the group (group data) in a group data storage area 154.

The message acquirer 106 acquires the message from the message server 20. For example, in the case where the timeline display 108, which will be described below, shows a timeline, the message acquirer 106 acquires a message that is related to the shown timeline and that is not acquired by using the API provided by the message server 20.

In the present embodiment, it is assumed that the message server 20 sends, together with the message, message data that includes information on the message (poster information indicating a poster of the message, destination information indicating the message destination, posted date/time, and the like). The message acquirer 106 stores the message data that is acquired from the message server 20 in a message database 156.

The timeline display 108 arranges the message that is exchanged between the user who uses the terminal device 10 and the specific friend and the message that is exchanged in the specified group in chronological order in one direction on the basis of the posted date/time of the messages or the like, and shows the messages on the display 130. The user can check the messages in chronological order by checking the timeline.

The message receiver 109 receives input of the message (a content to be posted) to be posted to the timeline that the timeline display 108 shows, and acquires the input content. For example, the message receiver 109 shows a user interface (for example, an input field such as a text box), which is used to input characters, on the display 130. The message receiver 109 may show, on the display 130, a user interface used to input a content other than the characters, such as the voice, the icon image, the handwritten characters, the function button of the application, and the gesture.

The message poster 110 posts the message. For example, the message poster 110 sends, together with required information for posting, the message that is received by the message receiver 109 to the message server 20 by using the API provided by the message server 20. The required information for posting is information on the poster (the account name of the user who uses the terminal device 10) and the information on the destination (the account name that identifies the user or the device as the message destination or a group ID that identifies the group), for example.

Posting to the timeline means posting the message to be shown in the timeline that is shown on the display 130. More specifically, in the case where the timeline of the messages that are exchanged between the user who uses the terminal device 10 and the friend is shown, the message poster 110 posts the message that is addressed to the friend. In the case where the timeline of the messages addressed to the group is shown, the message poster 110 posts the message that is addressed to the group.

The communicator 120 is a functional device that is used when the terminal device 10 communicates with the external device such as the message server 20. For example, the communicator 120 is constructed of a communication module that can be connected to a network interface card (NIC) that is used in the wired/wireless LAN or Long Term Evolution (LTE)/LTE-Advanced (LTE-A)/License-Assisted Access using LTE (LAA)/5G bandwidth.

The display 130 is a functional device that shows various types of the information and is constructed of a display such as a liquid-crystal display (LCD), for example. The input section 140 is a functional device that accepts input of the operation by the user who uses the terminal device 10, and is constructed of an input section such as a touch panel. A touch panel input can be detected by any common detection method using, for example, a resistive film, infrared light, electromagnetic induction, or electrostatic capacity. The display 130 and the input section 140 may be integrally formed. Alternatively, the input section 140 may be constructed of various operation devices such as a mouse and a keyboard as long as the user can input the information by using the input section 140.

The storage 150 is a storage that stores the various programs required for operation of the terminal device 10 and various types of data. The storage 150 is constructed of a solid-state drive (SSD), a hard disk drive (HDD), or the like as semiconductor memory, for example.

The storage 150 stores the destination list 152 and a message application 158, and further secures the group data storage area 154 and the message database 156 as storage areas.

In the destination list 152, the account name of the friend of the user who uses the terminal device 10. In addition to the account name, additional information such as a name and an icon of the user or device that is identified by the account name may be stored in the destination list 152.

In the group data storage area 154, the group data is stored. As illustrated in FIG. 3, for example, as the group data, the group ID (for example, "ROOM-A") that identifies the group, the group name (for example, "MFP Group"), and the account names indicating the members (for example, "suzuki, mx6060, mx3050, mx360, mx60") who belong to the group are stored.

The message database 156 stores the message data. As illustrated in FIG. 4, for example, the message data includes the poster information (for example, "suzuki"), the destination information (for example, "ROOM-A"), the message posted date/time (for example, "2020/05/25 12:00:00"), and the message (for example, "A4, DOUBLE-SIDED, STAPLE") are included.

As the poster information, the account name of the user or the device that has posted the message is stored. As the destination information, the account name or the group ID that indicates the message destination is stored.

The message application 158 is an application for using a function (the talk function) that exchanges the message and is provided by the message server 20. When being read and executed by the controller 100, the function of each of the destination manager 102, the group manager 104, the message acquirer 106, the timeline display 108, the message receiver 109, and the message poster 110 is implemented.

The message application 158 provides a display screen or a user interface (UI) for using the above-described functions. Accordingly, by executing the message application 158, the controller 100 shows a screen (the talk screen) for exchanging the message or a screen for managing the friends and the groups on the display 130.

1.2.2 Message Server

Figure 5:
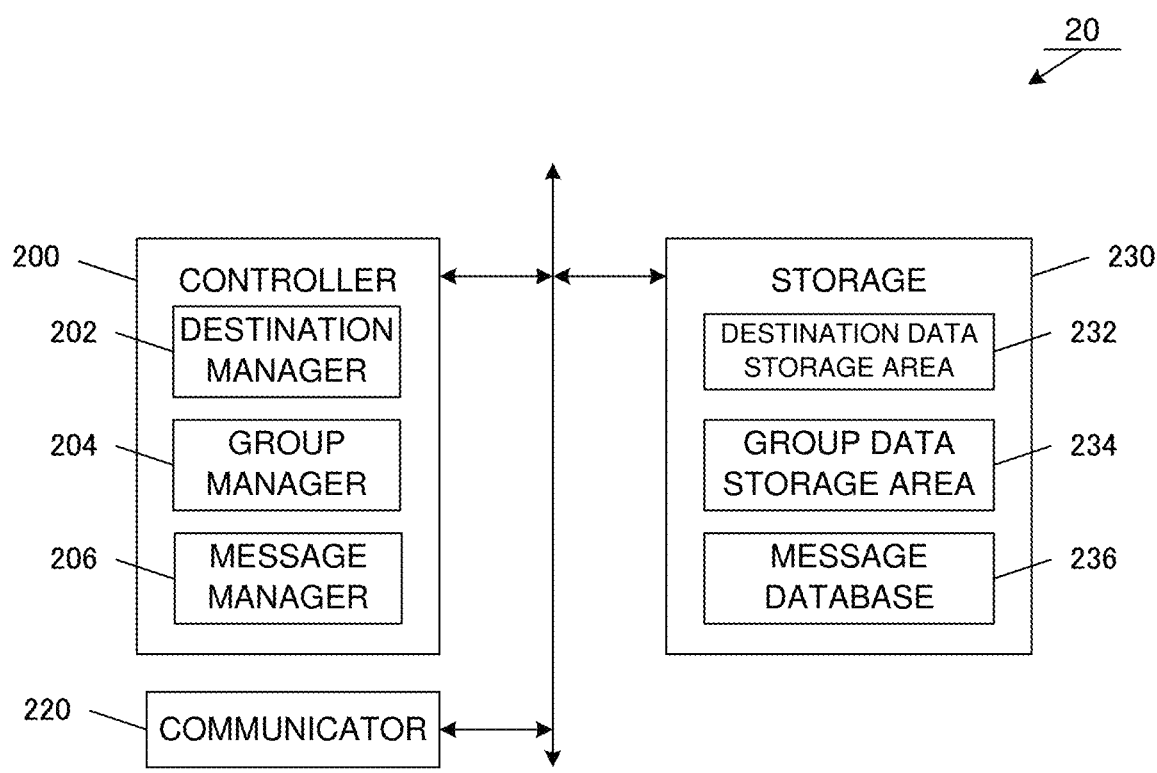
FIG. 5 is a diagram for illustrating a functional configuration of a message server in the first embodiment.

A description will be made on a functional configuration of the message server 20 in the present embodiment will be described with reference to FIG. 5. As illustrated in FIG. 5, the message server 20 includes a controller 200, a communicator 220, and a storage 230.

The controller 200 is a functional device that controls the entire message server 20. The controller 200 implements various functions by reading and executing various programs stored in the storage 230, and is constructed of one or plural arithmetic devices (for example, the CPUs).

When executing the programs, the controller 200 functions as a destination manager 202, a group manager 204, and a message manager 206.

The destination manager 202 manages a relationship with the user or the device (the friend) that can be specified as the message destination in the SNS. For example, when receiving information that includes two account names of the users and/or the devices as the friends from the terminal device 10 or the multi-function peripheral 30, the destination manager 202 associates the accounts of the users and/or the devices indicated by the two account names with each other as being in a friendship. The destination manager 202 stores a result of the association as destination data in a destination data storage area 232, and sends information indicative of the mutual association to the device used by the user and the device that have become friends.

The destination data is data that stores, per account, information on another account (for example, the account name) that is the friend of the account, for example.

The group manager 204 manages the group in the SNS. For example, when receiving information that includes the account names of the users and/or the devices included in the newly created group and the group name from the terminal device 10, the group manager 204 associates the users and/or the devices identified by the account names as being in a member relationship of the group. The group manager 204 generates the group ID and stores the group data in a group data storage area 234, and the group data includes: the generated group ID; and the account names and the group name received from the terminal device 10. In addition, the group manager 204 sends information indicating the association as the group member to the device used by the user who has become the group member or the device that has become the group member.

The message manager 206 stores and sends the message data. For example, in the case where the message manager 206 receives the message and the required information for posting from the device that is connected to the message server 20, the message manager 206 stores, in a message database 236, the message data that includes the received information and specified information (for example, the posted date/time).

In the case where the device that is connected to the message server 20 requests acquisition of the message via the API or the like, the message manager 206 reads the message from the message database 236, and sends the message to the device that requests the acquisition of the message.

The communicator 220 is a functional device that is connected to the LAN and exchanges the information with the other devices such as the terminal device 10 and the multi-function peripheral 30, for example. As a communication method, the communicator 220 uses a communication method such as the LAN that is Ethernet®.

The storage 230 is a functional device that stores the various programs required for operation of the message server 20 and various types of the data. The storage 230 is constructed of the SSD, the HDD, or the like as the semiconductor memory, for example.

In the storage 230, the destination data storage area 232, the group data storage area 234, and the message database 236 are secured.

The destination data storage area 232 is an area in which the destination data managed by the destination manager 202 is stored. The group data storage area 234 is an area in which the group data managed by the group manager 204 is stored. A data structure of the group data is similar to that of the group data illustrated in FIG. 3. The message database 236 is an area in which the message data managed by the message manager 206 is stored. A data structure of the message data is similar to that of the message data illustrated in FIG. 4.

1.2.3 Multi-Function Peripheral

In the present embodiment, the multi-function peripheral 30 is a device capable of posting the message to the SNS, and is a device is capable of becoming friends with the user.

Figure 6:
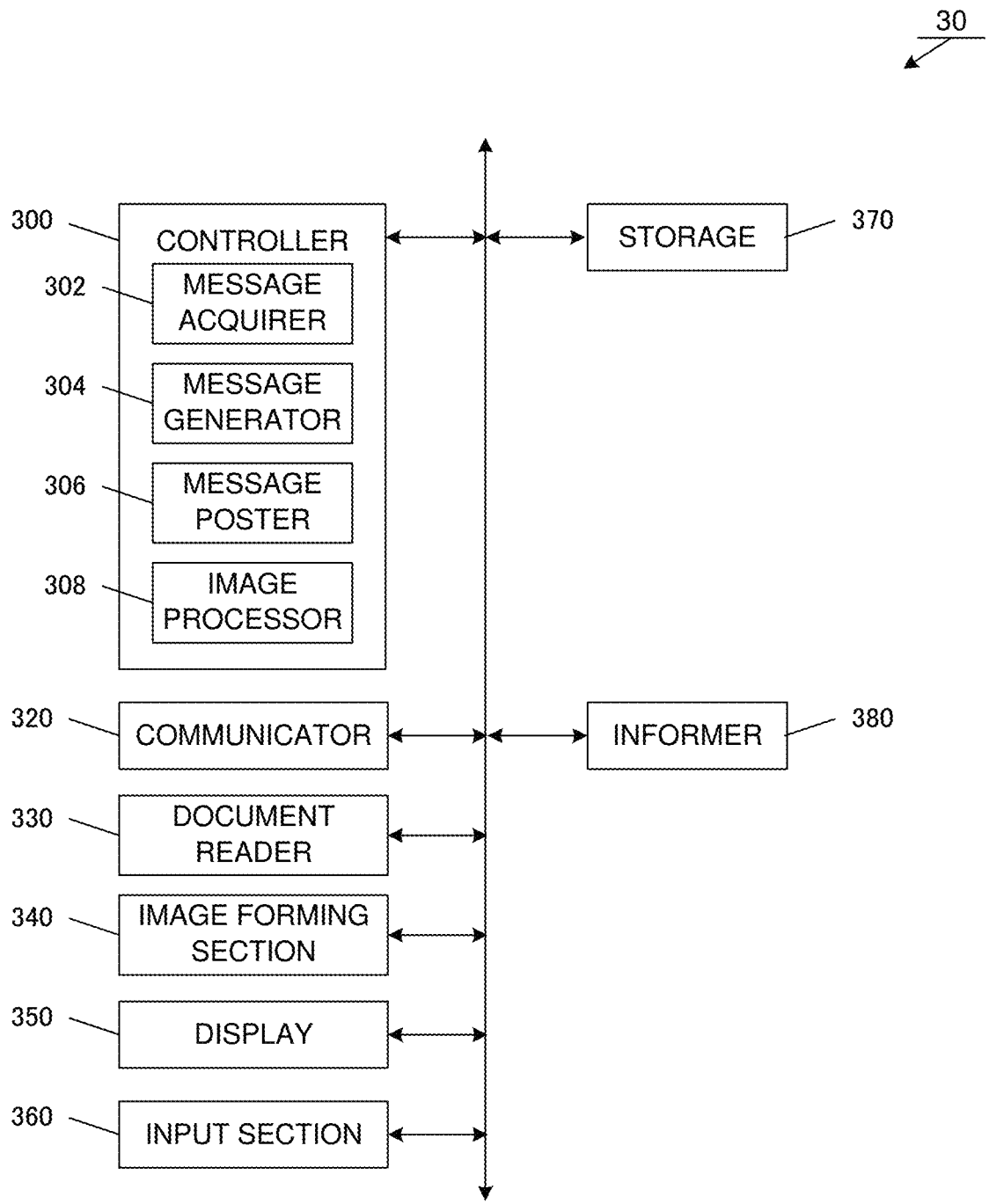
FIG. 6 is a diagram for illustrating a functional configuration of a multi-function peripheral in the first embodiment.

A description will be made on a functional configuration of the multi-function peripheral 30 in the present embodiment with reference to FIG. 6. As illustrated in FIG. 6, the multi-function peripheral 30 is configured to include a controller 300, a communicator 320, a document reader 330, an image forming section 340, a display 350, an input section 360, a storage 370, and an informer 380.

The controller 300 is a functional device that controls the entire multi-function peripheral 30. The controller 300 implements various functions by reading and executing various programs stored in the storage 370, and is constructed of one or plural arithmetic devices (for example, the CPUs).

When executing the programs, the controller 300 functions as a message acquirer 302, a message generator 304, a message poster 306, and an image processor 308.

The message acquirer 302 acquires, from the message server 20, the message that is posted and addressed to the multi-function peripheral 30 and the message that is posted and addressed to the group including the multi-function peripheral 30 by using the API provided by the message server 20.

The message generator 304 recognizes the message that is acquired from the message acquirer 302, and generates the message that is a response thereto.

The message poster 306 posts the message. For example, the message poster 306 sends, to the message server 20, the message generated by the message generator 304, the information on the poster (the account name corresponding to the multi-function peripheral 30), and the information on the message destination by using the API provided by the message server 20.

The image processor 308 executes general image processing. The image processor 308 executes sharpening processing and tone conversion processing on an image of a document that is read by the document reader 330, for example.

The communicator 320 is a functional device that is connected to the LAN and exchanges the information with the other device such as the message server 20, for example. As the communication method, the communicator 320 uses the communication method such as the LAN that is Ethernet®.

The document reader 330 is a functional device that reads the document. For example, the document reader 330 is realized by a document reading device such as a scanner, and inputs image data that is output from the document reading device to the multi-function peripheral 30.

The image forming section 340 is a functional device that forms (prints) the image on the recording medium. The image forming device 340 is constructed of a laser printer or the like that uses electrophotography, for example.

The display 350 is a functional device that shows the various types of the information, and is constructed of a display such as the LCD, for example. The input section 360 is a functional device that accepts an operation performed by the user, and is constructed of various key switches, an input section that detects input by contact, or the like. The user inputs the function to be used and print settings via the input section 360. Here, the multi-function peripheral 30 may include a touch panel in which the display 350 and the input section 360 are integrally formed. In this case, the touch panel input can be detected by any common detection method using, for example, the resistive film, the infrared light, the electromagnetic induction, or the electrostatic capacity.

The storage 370 is a functional device that stores the various programs required for operation of the multi-function peripheral 30 and the various data. The storage 370 is constructed of the SSD, the HDD, or the like as the semiconductor memory, for example.

The informer 380 is a functional device that informs the user of a location of the multi-function peripheral 30 by means of informing operation that emits light or sound. For example, the informer 380 may be a light-emitting device (for example, a lamp such as a light-emitting diode) including a light source that can be turned on or off or an audio output device (for example, a speaker) that can output the sound.

1.3 Processing Flows

A description will be made on flows of processing in the present embodiment. It is assumed that the user who uses the terminal device 10 has become friends with the multi-function peripheral 30 to be used and that the group including the multi-function peripheral 30 as the friend has been created. The multi-function peripheral 30 that is the friend of the user who uses the terminal device 10 will be described as the friend-registered multi-function peripheral 30.

1.3.1 Terminal Device

Figure 7:
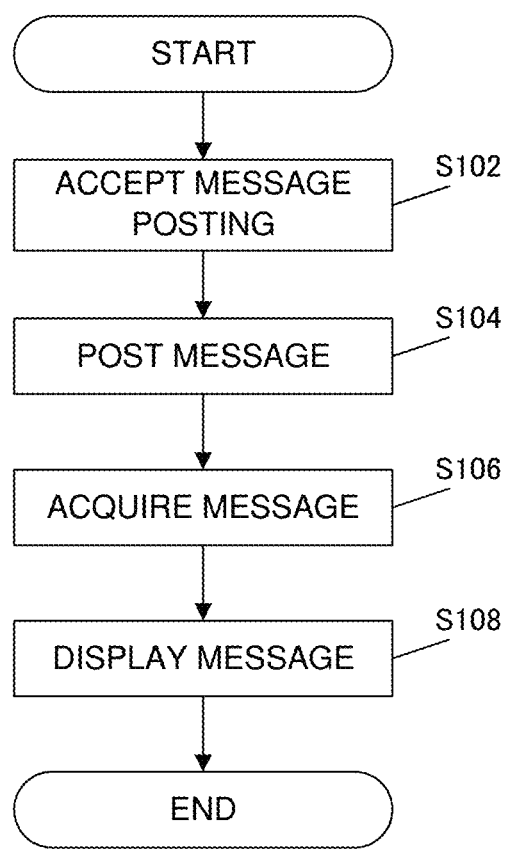
FIG. 7 is a flowchart for illustrating a flow of main processing by a terminal device in the first embodiment.

A description will be made on a flow of main processing by the terminal device 10 in the present embodiment with reference to FIG. 7. The processing illustrated in FIG. 7 is executed when the controller 100 reads and runs the message application 158. In the present embodiment, it is assumed that the processing illustrated in FIG. 7 is executed when the message that is exchanged in the specified group is shown in the timeline.

First, the controller 100 (the message receiver 109) accepts the input of the message to be posted from the user (step S102). For example, the controller 100 (the message receiver 109) accepts posting of the message when the user inputs the content (the content to be posted) of the message to be posted in the input field, in which the message is input, and selects a button for posting.

The content of the message may include a request to the multi-function peripheral 30. The request is a description that includes a function name and a print setting option, and is a statement indicating the content of the processing, use of which is desired by the user. For example, the request is the text data such as "A4, DOUBLE-SIDED, STAPLE".

The function name is a word or a phrase with which the function can be identified, and examples of the function name are "STAPLE", "MULTIPLE PAGE PRINTING", or "DOUBLE-SIDED PRINTING". The description of the print setting option includes a word indicating paper size such as "A4" or "B5", a word indicating a scaling ratio such as "70%" or "141%", and a phrase indicating a paper type such as "plain paper" or "glossy paper". The request may include the plural descriptions of the names of the functions and the print setting options.

Next, the controller 100 (the message poster 110) posts the message to the timeline (step S104).

The controller 100 (the message acquirer 106) acquires the message (the message data) from the message server 20 (step S106). In addition, the controller 100 (the timeline display 108) shows the timeline including the acquired message (step S108).

The above-described processing allows the user to check, via the timeline, the message that is exchanged in the group including the friend-registered multi-function peripheral 30. In addition, in the case where the friend-registered multi-function peripheral 30 posts the message as the response, the user can check, via the timeline, the message posted by the friend-registered multi-function peripheral 30.

1.3.2 Image Forming Device

A description will be made on a flow of main processing by the multi-function peripheral 30 in the present embodiment with reference to FIG. 8. First, the controller 300 (the message acquirer 302) acquires the message that is addressed to the group, to which the multi-function peripheral 30 belongs, from the message server 20 (step S152).

Next, the controller 300 determines whether the message acquired in step S152 includes the request (step S154). For example, the controller 300 extracts, from the message, the description of the function name and the print setting option. For example, the controller 300 divides the acquired message by a separator character such as a space, a comma, or a midpoint, and matches the description of the message with the function name or the print setting option. Alternatively, the controller 300 analyzes the acquired message by using a technique such as machine learning.

As a specific example, in the case where the message includes a sentence such as "A4, DOUBLE-SIDED, STAPLE", the controller 300 determines that the processing request including the paper size of "A4" and use of the function "DOUBLE-SIDED PRINTING" and the function "STAPLE" is included in the message. Here, in the case where a part of the description indicating the function name or the print setting option is omitted in the description of the message, such as "DOUBLE-SIDED", the controller 300 may supplement or modify the description.

If the message does not include the request, the controller 300 executes specified processing on the basis of the content of the message (step S154; No). For example, the controller 300 may post a message that includes an example of the message including the request with the user as the message destination, or may post the message indicating a current status of the multi-function peripheral 30.

On the other hand, if the message includes the request, the controller 300 determines whether the request can be processed (step S154; Yes→step S156). A case where the request can be processed is a case where all of the following conditions are satisfied, for example.

(1) A Function of Processing the Request is Included.

The controller 300 determines that the function of processing the request is provided in the case where all the functions that are identified by the function names included in the message can be implemented in the multi-function peripheral 30. In the case where even one of the functions requested by the user cannot be implemented (the functions are not provided), the controller 300 determines that the request cannot be processed.

(2) No Failure Related to the Request has Occurred.

In the case where no failure related to a cause that discontinues the processing has occurred at the time of processing the request, the controller 300 determines that no failure related to the request has occurred. For example, in the case where "A4" is included in the request, the controller 300 determines that the paper in "A4" size is not run out or that there is no paper jam. In the case where the request includes "STAPLE", the controller 300 determines that a staple strip remains. In the case where it is assumed to process the request and where the processing is discontinued due to the failure occurred to the multi-function peripheral 30, the controller 300 determines that the failure related to the request has occurred.

(3) Execution of the Processing can be Started within a Specified Time.

The controller 300 determines whether the execution of the processing can be started within a specified time, which is set in advance (for example, within one minute). For example, in the case where a currently-executed job is not terminated within the specified time, the controller 300 determines that the execution of the processing cannot be started within the specified time.

The above-described conditions merely constitute one example. Accordingly, the controller 300 may determine whether the request can be processed after removing one or some conditions from the above-described conditions, or may determine whether the request can be processed after adding a condition other than the above-described conditions.

If the request cannot be processed, the controller 300 terminates the main processing (step S156; No). If the request can be processed, the controller 300 posts the message indicating that the request can be processed (step S156; Yes→step S158).

For example, as the response to the message including the request, the message generator 304 generates the message indicating that the request can be processed (for example, "PRINTER READY!" or "I CAN PRINT"). Furthermore, the message poster 306 posts the message generated by the message generator 304 with the group, which is specified as the destination of the message acquired in step S152, as the destination. In this way, the message poster 306 posts the message acquired by the terminal device 10 that is used by the user who has posted the message including the request. By the way, posting of the message, which can be acquired by the terminal device 10 used by the user who has posted the message, by the controller 300 will be referred to as the reply.

Next, the controller 300 (the message acquirer 302) acquires the message addressed to the group, to which the multi-function peripheral 30 belongs, from the message server 20 (step S160). The controller 300 determines whether the multi-function peripheral 30 (an own peripheral) is specified as a processing execution destination by the message that is acquired in step S160 (step S162).

A case where the own peripheral is selected as the processing execution destination is a case where the message acquired in step S160 includes the description indicating the multi-function peripheral 30 (the own peripheral). For example, in the case where a name (for example, a model name, a series name, or a model number) of the multi-function peripheral 30 (the own peripheral) is partially or entirely included, the controller 300 determines that the own machine is specified as the processing execution destination.

If the own peripheral is selected as the processing execution destination, the controller 300 controls the informer 380 and performs informing operation (step S162; Yes→step S164). For example, in the case where the informer 380 is constructed of the light-emitting device, the controller 300 turns on or blinks the light source. In the case where the informer 380 is constructed of the audio output device, the controller 300 causes the informer 380 to output a specified informing sound is output or an audio guidance.

1.4 Operation Example

Figure 9A:
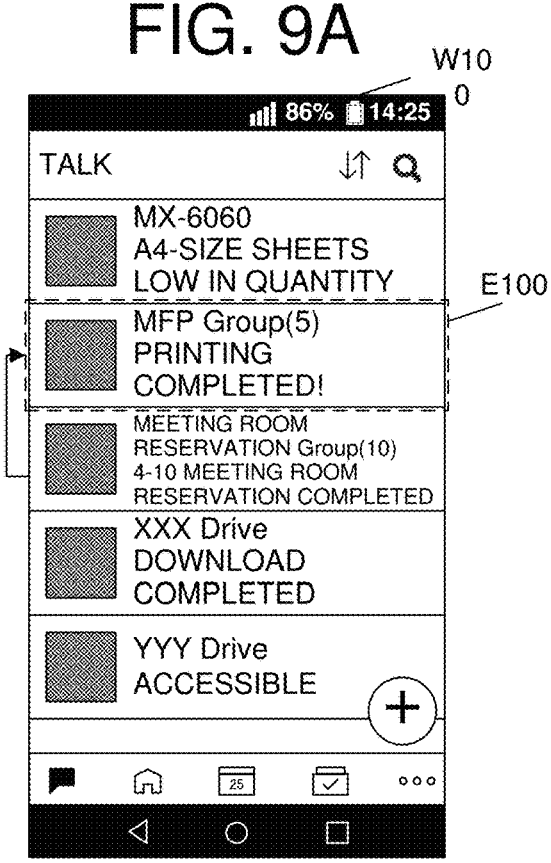
FIGS. 9A to 9C include views for illustrating an operation example in the first embodiment.
Figure 9B:
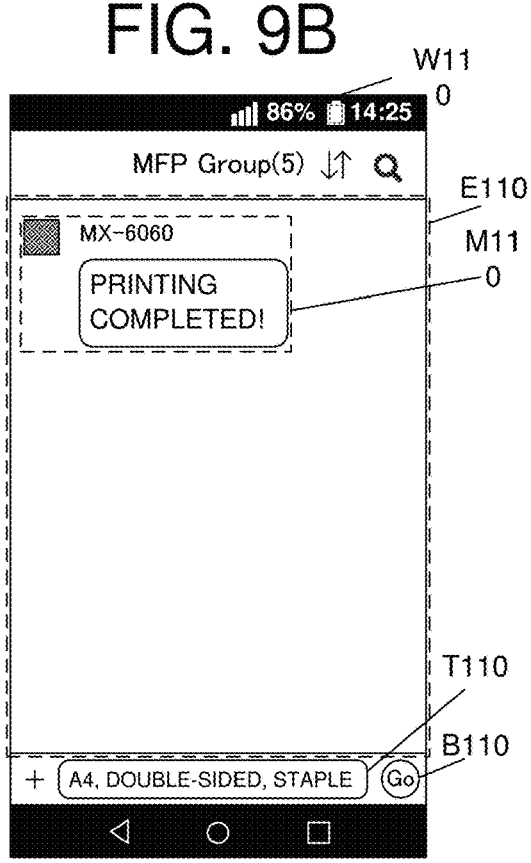
Figure 9C:
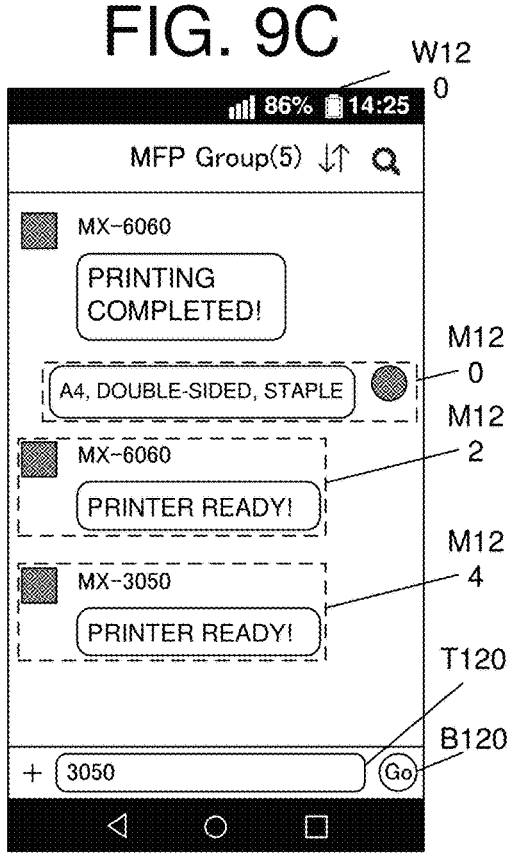

A description will be made on an operation example in the present embodiment. FIGS. 9A to 9C includes views, each of which illustrates the display screen shown on the display 130 when the message application 158 is executed in the terminal device 10. FIG. 9A is a view illustrating a display screen W100 used to select the friend or the group as the message destination. For example, by selecting an area E100, the user can select the group ("MFP Group" in an example in FIG. 9A).

FIG. 9B illustrates an example of a display screen W110 (the talk screen) that is shown on the display 130 when the area E100 is selected in FIG. 9A. The display screen W110 includes an area E110 for showing the timeline, an input field T110 used to input the content of the message to be posted, and a button B110 for posting the message.

In the area E110, the message (for example, a message M110) that is exchanged in the group is shown, and the group is selected by the user on the display screen W100. In addition to the message, a name or an icon of the user or the multi-function peripheral that has posted the message may be shown in the timeline.

When the user inputs the request in the input field T110 and selects the button B110, posting of the message to the group, which is selected on the display screen W100, is accepted.

FIG. 9C illustrates an example of a display screen W120 that is shown on the display 130 when "A4, DOUBLE-SIDED, STAPLE" is input in the input field T110 and the button B110 is selected on the display screen W110. The timeline on the display screen W120 shows a message M120 posted by the user as well as a message M122 and a message M124 posted by the multi-function peripheral 30 that can process the request described in the message posted by the user. When seeing the name of the multi-function peripheral 30 that has posted the message M122 and the message M124, the user can acknowledge the multi-function peripheral 30 that can process the request (A4, DOUBLE-SIDED, STAPLE).

Furthermore, the user can input the name of the multi-function peripheral 30, which executes the processing, in an input field T120 included in the display screen W120, and can post the message including the name of the multi-function peripheral 30.

Figure 10A:
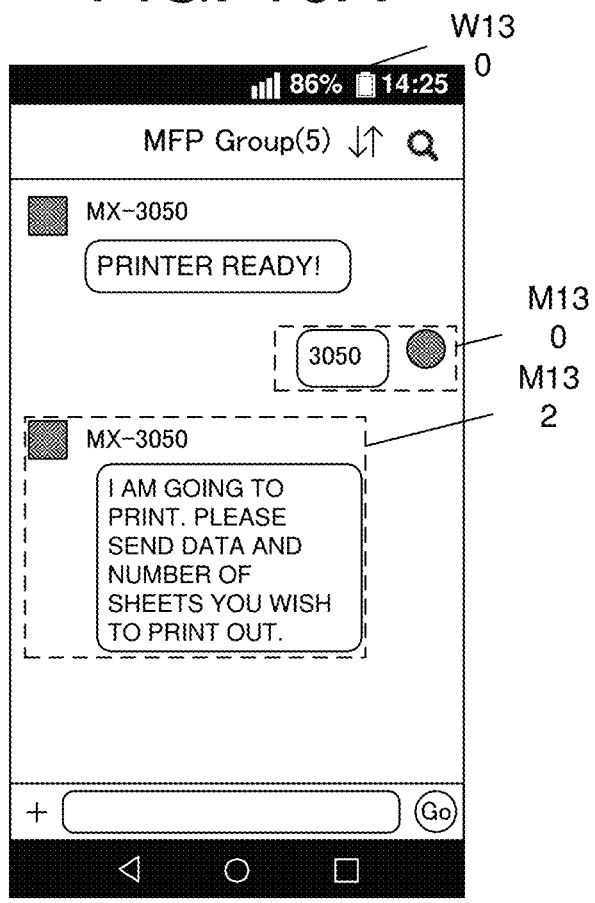
FIGS. 10A to 10B include views for illustrating the operation example in the first embodiment.
Figure 10B:
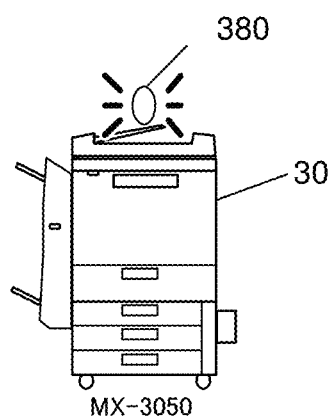

FIGS. 10A to 10B include views illustrating a case where the multi-function peripheral 30 that executes the processing requested by the user is specified. FIG. 10A illustrates an example of a display screen W130 that is shown on the display 130 when a message M130 including a part of the name of the multi-function peripheral 30 is posted. The display screen W130 shows a message M132 posted by the multi-function peripheral 30 that executes the processing. FIG. 10B illustrates a case where the light source is emitting light as the informing operation in the multi-function peripheral 30 that executes the processing. The user can find the multi-function peripheral 30 that executes the processing by checking the multi-function peripheral 30, the light source of which emits the light.

In the case where the user selects the multi-function peripheral 30 capable of processing the request on the display screen W120 or the display screen W130, a screen (the talk screen) may be shown to show the message that is exchanged between the selected multi-function peripheral 30 and the user. On the shown screen (the talk screen), the user may send data to be printed (for example, an image file or a document file) to the multi-function peripheral 30, so as to cause the multi-function peripheral 30 to execute a job to output the sent data.

The embodiment may be changed an embodiment not described above within the scope that there is no contradiction.

For example, in step S104, the controller 100 (the message poster 110) in the terminal device 10 may post a message that requests a large number of prints (for example, a message such as "PRINT 100 COPIES"). In this case, in step S156, the controller 300 in the multi-function peripheral 30 may post a message indicating that the plural multi-function peripherals 30 capable of executing distributed processing can cooperate with each other for the processing.

More specifically, the plural multi-function peripherals 30, each of which has a function of distributing the job for printing the large number of copies by specified number of copies (a distributed printing function or a tandem printing function), may be connected to the network NW. In this case, in step S156, the multi-function peripherals 30 having the distributed printing function post the messages. In the case where the user submits the job to one of the multi-function peripherals 30 that have posted the messages in step S156, the multi-function peripheral 30, to which the job is submitted, distributes the submitted job to the multi-function peripherals 30 that have submitted the messages in step S156.

Alternatively, the multi-function peripheral 30 that serves as a parent peripheral and the multi-function peripheral 30 that serves as a child peripheral may be connected to the network NW, and a multi-function peripheral having such a function (a print release function) may be connected that the child peripheral can acquire and print data that is a print target stored in the parent peripheral. In this case, the parent peripheral and the child peripheral post the message in step S156, and, in particular, the parent peripheral posts the message indicating that the parent peripheral is a device, to which the data to be printed is input. By inputting the data as the print target to the parent peripheral, the user can cause the parent peripheral and the child peripheral to print the data.

In the case where the multi-function peripheral 30 executes the distributed processing, the multi-function peripheral 30 may appropriately post the message that informs the user of the multi-function peripheral 30 performing printing, or may appropriately post the message indicating a necessary operation, so that the user can efficiently execute the distributed processing.

In the present embodiment, the description has been made that the message data includes the destination information in addition to the message. However, the destination information may be included in the message. For example, the message destination may be indicated by the account name or the group ID that is described after a specified symbol (for example, "@"). In this case, the user can post the message addressed to the group with the group ID "ROOM-A" by posting the message with the content "@ROOM-A, A4, DOUBLE-SIDED, STAPLE". In addition, in step S158, the message generator 304 in the multi-function peripheral 30 only needs to generate the message including the destination information.

According to the present embodiment, when the user posts, on the talk screen, the message that includes the request indicating the function that the user wishes to use and the like, the multi-function peripheral capable of handling the request replies (responses). Thus, the user can find the multi-function peripheral that can achieve what the user wishes to do. Therefore, the user does not have to search for the multi-function peripheral capable of processing the request, and the user does not have to understand the functions provided by the multi-function peripheral in advance.

2. Second Embodiment

Next, a description will be made on a second embodiment. The second embodiment is an embodiment in which, in addition to the processing in the first embodiment, the user is informed of information on another multi-function peripheral capable of processing the request in the case where when the request by a user cannot be processed. In the present embodiment, FIG. 1 in the first embodiment is replaced with FIG. 11, and FIG. 8 in the first embodiment is replaced with FIG. 14. The same functional devices and processing will be denoted by the same reference numerals, and the description thereon will not be made.

2.1 Overall Configuration

Figure 11:
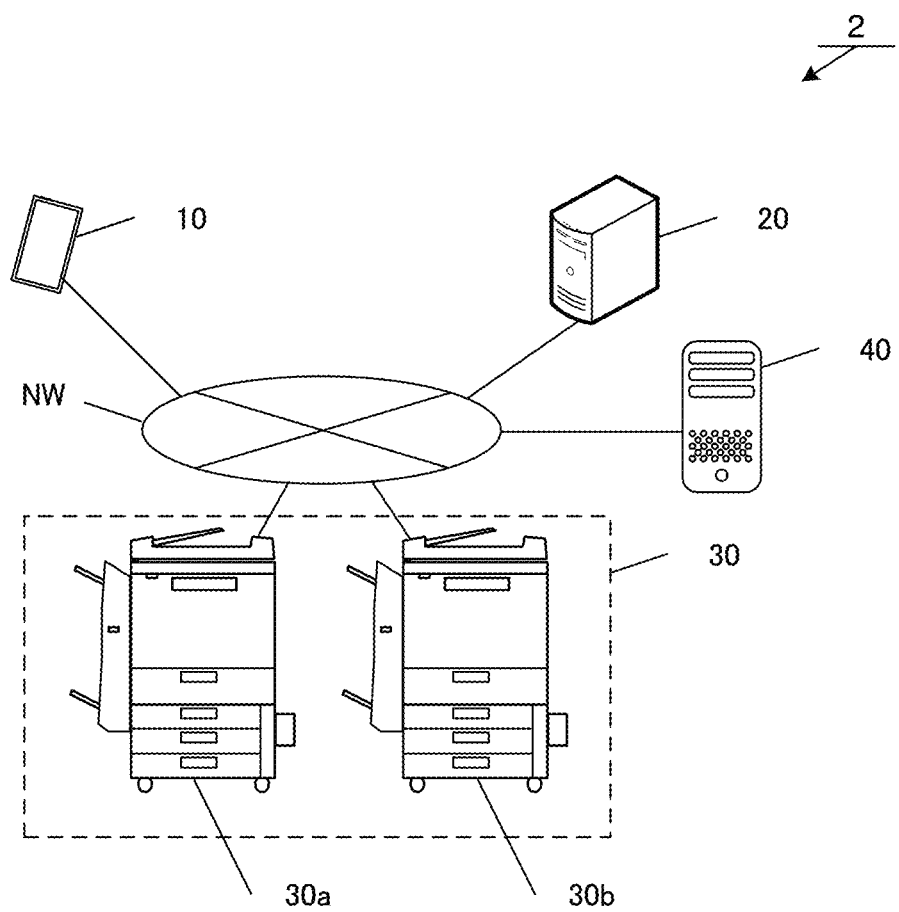
FIG. 11 is a view for illustrating an overall configuration of a printing system in a second embodiment.

FIG. 11 illustrates an overall configuration of the present embodiment. A printing system 2 in the present embodiment differs from that in the first embodiment in a point that a management server 40 is further connected to the network NW. The management server 40 is an information processor (a server) that manages the multi-function peripheral 30 connected to the network NW.

Figure 12A:
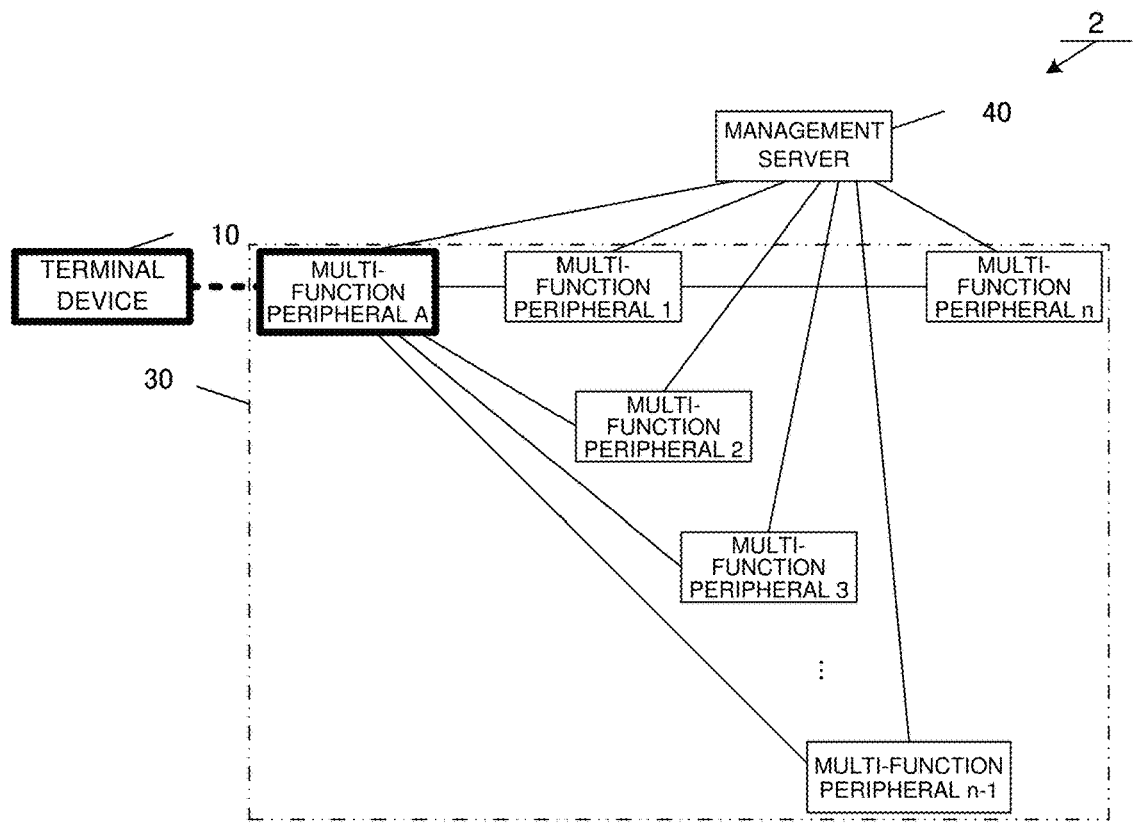
FIGS. 12A to 12B include diagrams for schematically illustrating the overall system in the second embodiment.
Figure 12B:
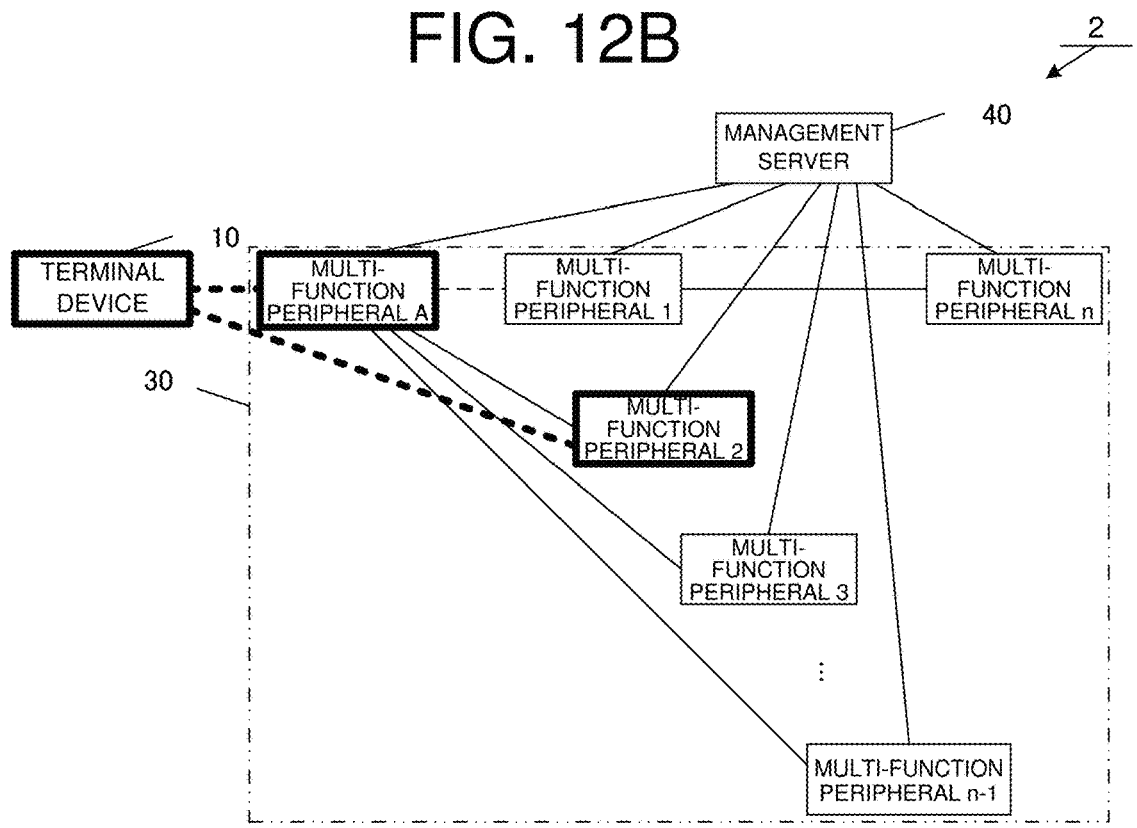

FIGS. 12A to 12B include diagrams schematically illustrating the overall configuration in the present embodiment. The devices that are connected by solid lines in FIGS. 12A to 12B indicate that such devices are in a relationship capable of exchanging information with each other. The multi-function peripherals 30 and the terminal device 10, which is used by the user, connected by dotted lines in FIGS. 12A to 12B indicate that the multi-function peripherals 30 and the terminal device 10 are the friends in the SNS. In addition, it is assumed that the printing system 2 includes, as the multi-function peripherals 30, a multi-function peripheral A, a multi-function peripheral 1, a multi-function peripheral 2, a multi-function peripheral 3, . . . , a multi-function peripheral n−1, and a multi-function peripheral n. These multi-function peripherals 30 are under management of the management server 40.

FIG. 12A illustrates that the user who uses the terminal device 10 has become friends only with the multi-function peripheral A. The user can post the message including the request with the multi-function peripheral A as the destination.

In the case where the multi-function peripheral A cannot process the user's request, the multi-function peripheral A inquires the management server 40 for the multi-function peripheral 30 capable of processing the user's request. In the case where, as a result of the inquiry, the management server 40 informs that the multi-function peripheral 2 can process the user's request, the multi-function peripheral A replies to the terminal device 10 with the message including information on the multi-function peripheral 2. The multi-function peripheral 30 capable of processing the request (in this case, the multi-function peripheral 2) may or may not be friends with the terminal device 10 used by the user.

Furthermore, in the case where the terminal device 10 used by the user and the multi-function peripheral 30 capable of processing the request (in this case, the multi-function peripheral 2) are not friends with each other, the multi-function peripheral A sends a request, to the multi-function peripheral 2, to become friends with the user who uses the terminal device 10, so as to make the terminal device 10 used by the user and the multi-function peripheral 2 become friends with each other. By accepting the request, the multi-function peripheral 2 becomes friends with the terminal device 10 used by the user. FIG. 12B illustrates a case where the user who uses the terminal device 10 has become friends with the multi-function peripheral 2. As a result, the user can send the message to the multi-function peripheral 2.

2.2 Functional Configuration

Figure 13:
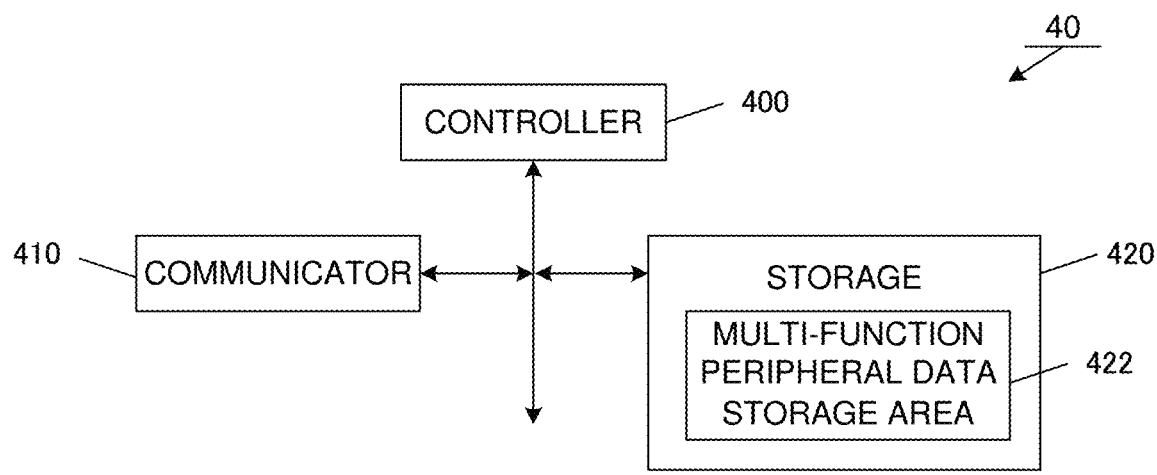
FIG. 13 is a diagram for illustrating a functional configuration of a management server in the second embodiment.

FIG. 13 is a block diagram for illustrating a functional configuration of the management server 40 in the present embodiment. As illustrated in FIG. 13, the management server 40 includes a controller 400, a communicator 410, and a storage 420.

The controller 400 is a functional device that controls the entire management server 40. The controller 400 implements various functions by reading and executing various programs stored in the storage 420, and is constructed of one or plural arithmetic devices (for example, the CPUs).

The communicator 410 is a functional device that is connected to the LAN and exchanges the information with the other device such as the multi-function peripheral 30, for example. As the communication method, the communicator 410 uses the communication method such as the LAN that is Ethernet®.

The storage 420 is a functional device that stores various programs required for operation of the management server 40 and various types of data. The storage 420 is constructed of the SSD, the HDD, or the like as the semiconductor memory, for example.

In the storage 420, a multi-function peripheral data storage area 422 is secured to store the information (multi-function peripheral data) on the multi-function peripherals 30 managed by the management server 40. In the multi-function peripheral data, as required information for communication with the multi-function peripheral 30, address information such as an IP address or a MAC address of the multi-function peripheral 30 is stored. In addition, as the multi-function peripheral data, information on the name of the multi-function peripheral 30, the message destination (the account name), specifications, performance, the installed location, and the like may be stored.

2.3 Processing Flows

A description will be made on flows of processing in the present embodiment. In the present embodiment, similar to the first embodiment, the terminal device 10 executes the main processing illustrated in FIG. 7. However, in the present embodiment, the main process is executed when the message that is exchanged between the particular friends is shown in the timeline. In this case, in step S102 of the main processing of the terminal device 10, the controller 100 (the message receiver 109) accepts the input of the content of the message that is addressed to the particular multi-function peripheral 30. In addition, in step S104 of the main processing of the terminal device 10, the controller 100 (the message poster 110) posts the message in the timeline and thereby sends, to the message server 20, the message that is addressed to the particular multi-function peripheral 30.

2.3.1 Multi-Function Peripheral 2.3.1.1 Main Processing

Figure 14:
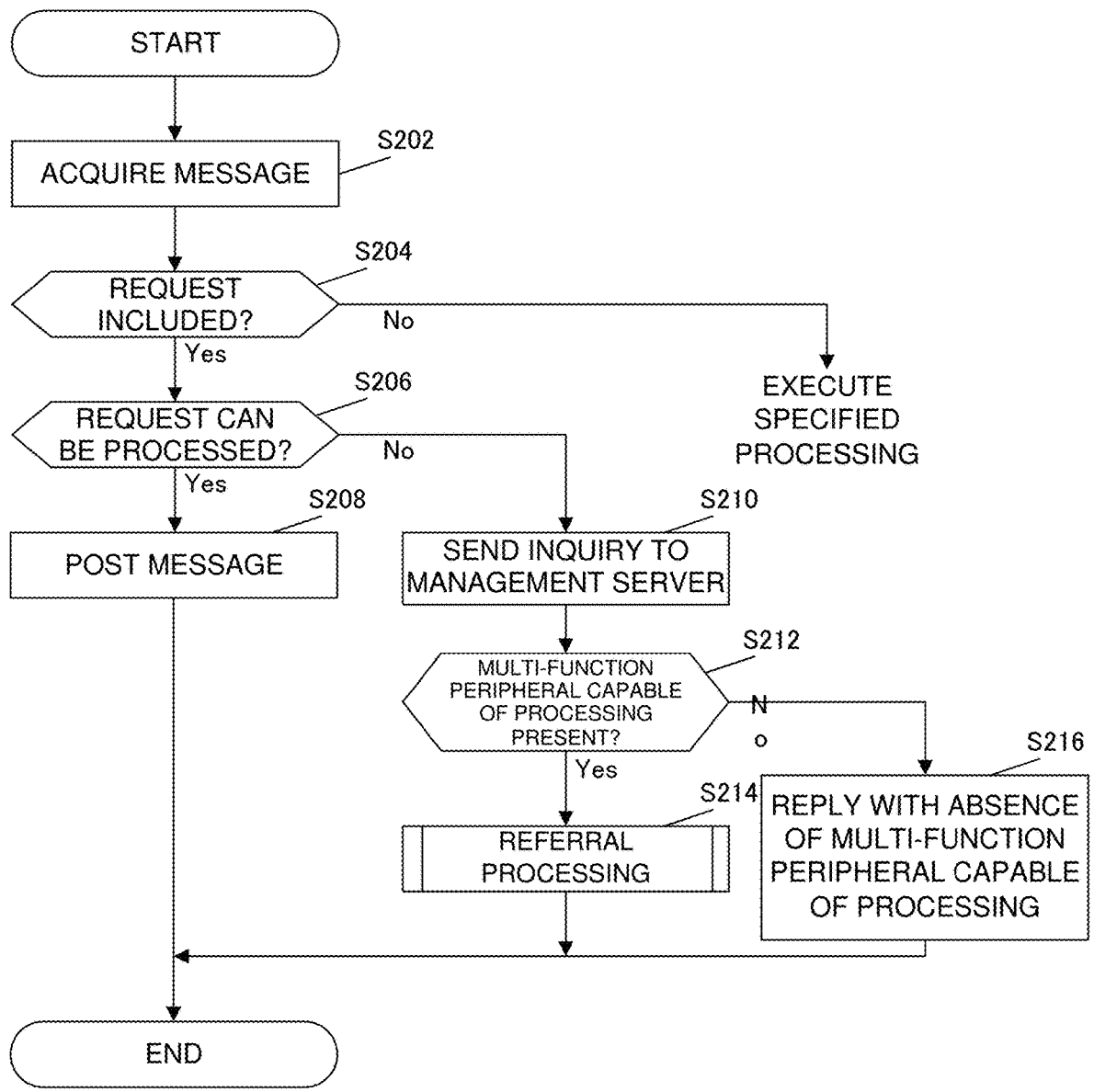
FIG. 14 is a flowchart for illustrating a flow of main processing by a multi-function peripheral in the second embodiment.

A description will be made on a flow of the main processing by the multi-function peripheral 30 in the present embodiment with reference to FIG. 14. The controller 300 (the message acquirer 302) acquires the message that is addressed to the multi-function peripheral 30 (the own peripheral) (step S202), and determines whether the acquired message includes the request (step S204). The processing in step S204 is the same as the processing in step S154.

If the message does not include the request, the controller 300 executes specified processing on the basis of the content of the message (step S204; No). On the other hand, if the message includes the request, the controller 300 determines whether the request can be processed (step S204; Yes→step S206). The processing in step S206 is the same as the processing in step S156.

If the request can be processed, the controller 300 replies with the message indicating that the request can be processed (step S206; Yes→step S208). The processing in step S208 is the same as the processing in step S158. However, in the present embodiment, in the case where the controller 300 replies with the message, the message destination is set to the account name of the user who has posted the message acquired in step S202.

On the other hand, if it is determined in step S206 that the request cannot be processed, the controller 300 sends, to the management server 40, the inquiry for the multi-function peripheral 30 capable of processing the request (step S206: No→step S210). In step S210, the inquiry that is sent by the controller 300 to the management server 40 includes information on the request that is posted by the user. The information on the request is the text data such as "A4, DOUBLE-SIDED, STAPLE", for example.

Next, the controller 300 acquires a result of the inquiry from the management server 40, and determines whether the multi-function peripheral 30 capable of processing the request exists on the basis of the result of the inquiry (step S212). For example, in the case where the result of the inquiry includes one or more pieces of the information on the name of the multi-function peripheral 30 capable of processing the request and the message destination (the account name), the controller 300 determines that the multi-function peripheral 30 capable of processing the request exists. Here, the multi-function peripheral 30 capable of processing the request may or may not be friends with the user who has posted the message including the request.

If the multi-function peripheral 30 capable of processing the request is not present, the controller 300 replies with the message indicating that the multi-function peripheral 30 capable of processing the request is not present (step S212; No→step S216).

If the multi-function peripheral 30 capable of processing the request exists, the controller 300 executes referral processing (step S212; Yes→step S214). The referral processing is processing to provide the user with the information on the multi-function peripheral 30 capable of processing the request and to make the user and the multi-function peripheral 30 capable of processing the request become friends with each other when the user and the multi-function peripheral 30 capable of processing the request are not friends.

Figure 15:
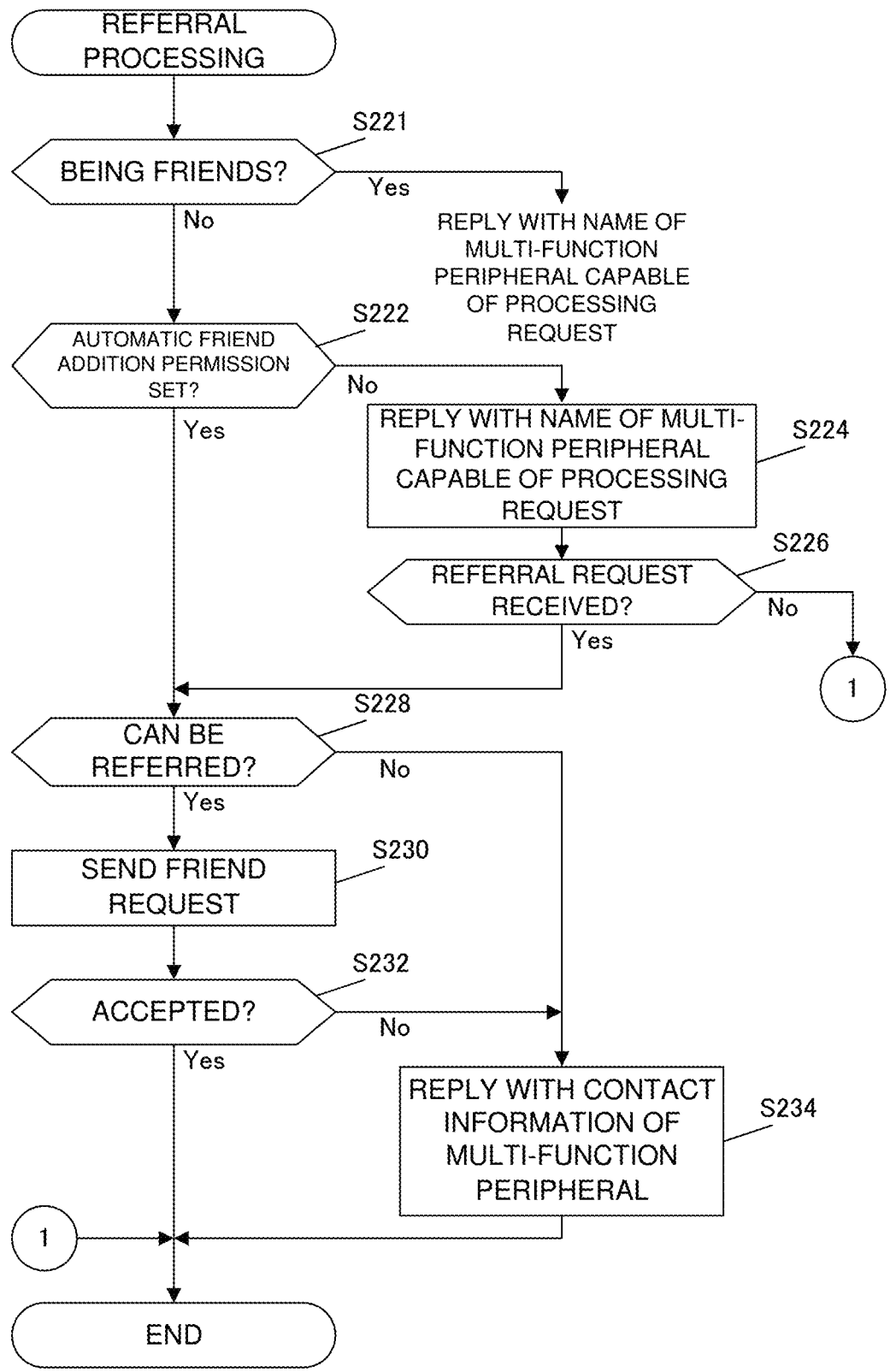
FIG. 15 is a flowchart for illustrating a flow of referral processing in the second embodiment.

A description will be made on a flow of the referral processing with reference to FIG. 15. First, the controller 300 determines whether the terminal device 10 used by the user who has posted the message including the request and the multi-function peripheral 30 capable of processing the request are friends (step S221). If the controller 300 determines that the terminal device 10 used by the user who has posted the message including the request and the multi-function peripheral 30 capable of processing the request are friends, the controller 300 replies with the name of the multi-function peripheral 30 capable of processing the request and terminates the referral processing. On the other hand, if the controller 300 determines that the terminal device 10 used by the user who has posted the message including the request and the multi-function peripheral 30 capable of processing the request are not friends in the step S221, the controller 300 determines whether the terminal device 10 used by the user who has posted the message including the request is set to permit automatic friend addition (whether such a setting is valid) (step S221; No→step S222). The automatic friend addition permission is a setting that allows the multi-function peripheral 30 to automatically add (register) the friend.

If the automatic friend addition permission is not set (such a setting is invalid), the controller 300 replies with the message including the name of the multi-function peripheral 30 capable of processing the request (step S222; No→step S224). For example, the controller 300 (the message generator 304) generates a message with such a content "MX-6060 CAN HANDLE YOUR REQUEST" on the basis of the name of the multi-function peripheral (for example, "MX-6060") that is included in the result of the inquiry acquired in step S204.

Next, the controller 300 determines whether the controller 300 has received a referral request from the user who has posted the message including the request within a specified time (step S226). The referral request is a message indicating the request for referral to allow the user to become friends with the multi-function peripheral 30 capable of processing the request and to post the message addressed to the multi-function peripheral 30. For example, the referral request is a message (text data) that includes all or a part of the name of the multi-function peripheral 30 capable of processing the request and a sentence indicating that the user wishes to be referred, such as "PLEASE REFER TO 6060". The referral request is accepted by the controller 100 in the terminal device 10 and is posted by the message poster 110.

In the case where the automatic friend addition permission is not set as described above, the controller 300 accepts the reception of the referral request for the specified time after replying to the message including the name of the multi-function peripheral 30 capable of processing the request. Accordingly, the user does not have to send the referral request when the user only wants to find the multi-function peripheral 30 capable of processing the request.

If the controller 300 determines that the automatic friend addition permission is set in step S222, or if the controller 300 receives the referral request in step S226, the controller 300 determines whether the multi-function peripheral 30 capable of processing the request can be referred (step S228).

For example, a case where the multi-function peripheral 30 capable of processing the request can be referred is a case where the multi-function peripheral 30 can communicate with the multi-function peripheral 30 capable of processing the request (a case where the multi-function peripheral 30 capable of processing the request is not down).

If the multi-function peripheral 30 capable of processing the request can be referred, the controller 300 sends a friend request to the multi-function peripheral 30 capable of processing the request (step S230). The friend request is information on making such a request on behalf of the user who has posted the message including the request that the user and the multi-function peripheral 30 capable of processing the request become friends with each other so that the multi-function peripheral 30 capable of processing the request to become friends can acquire the message from the user. For example, the friend request includes the account name of the user who has posted the message including the request. In this way, the controller 300 intermediates the friend request on the basis of the referral request by the user.

Next, the controller 300 determines whether the multi-function peripheral 30 capable of processing the request has accepted the friend request (step S232). For example, the controller 300 receives information on whether the friend request has been accepted from the multi-function peripheral 30 capable of processing the request, and makes the determination on the basis of the received information. If determining that the friend request has been accepted by the multi-function peripheral 30 capable of processing the request, the controller 300 terminates the referral processing (step S232; Yes).

If the multi-function peripheral 30 capable of processing the request cannot be referred in step S228, or if the multi-function peripheral 30 capable of processing the request does not accept the friend request in step S232, the controller 300 replies with the message including the destination (for example, the account name) of the multi-function peripheral 30 capable of processing the request (step S228; No, or step S232; No→step S234). The user can manually become friends with the multi-function peripheral 30 capable of processing the request on the basis of the destination that is included in the replied message. Alternatively, in step S234, the controller 300 may reply with the message that the friend cannot be referred.

2.3.1.2 Answer Processing

Figure 16:
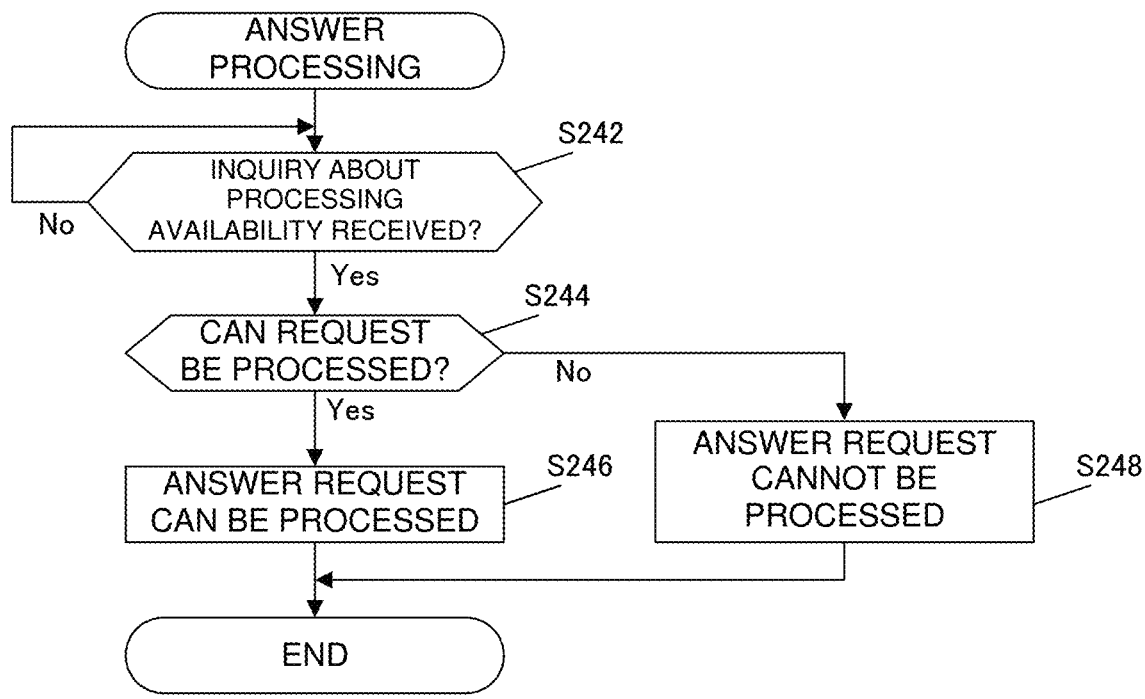
FIG. 16 is a flowchart for illustrating a flow of answer processing in the second embodiment.

Next, a description will be made on answer processing that is executed by the multi-function peripheral 30 with reference to FIG. 16. The answer processing is a processing that is executed by the controller 300 when the controller 300 receives, from the management server 40, an inquiry about whether the request can be processed (processing availability). The controller 300 executes the answer processing in parallel with the main processing.

First, the controller 300 determines whether the inquiry about the processing availability is received from the management server 40 (step S242). The inquiry about the processing availability is an inquiry that includes the information on the request posted by the user. The information on the request is the text data such as "A4, DOUBLE-SIDED, STAPLE", for example.

Next, the controller 300 determines whether the request that is indicated by the information on the request included in the inquiry about the processing availability can be processed (step S244). The processing in step S244 is the same as the processing in step S156 of the main processing.

If the request can be processed, the controller 300 sends, to the management server 40, an answer indicating that the request can be processed (step S244; Yes→step S246). If the request cannot be processed, the controller 300 sends, to the management server 40, an answer indicating that the request cannot be processed (step S244; No→step S248).

2.3.1.3 Request Handling Processing

Figure 17:
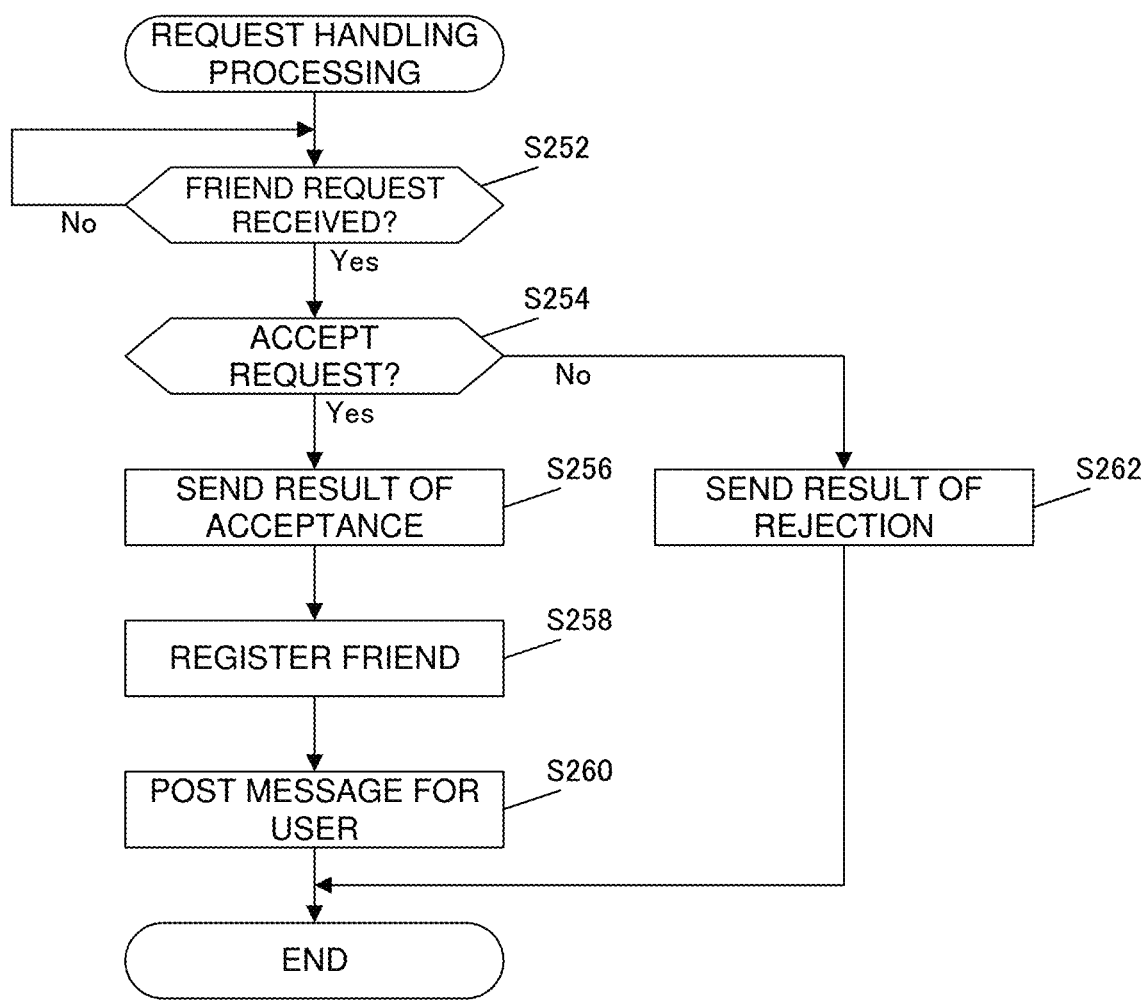
FIG. 17 is a flowchart for illustrating a flow of request handling processing in the second embodiment.

Next, a description will be made on request handling processing that is executed by the multi-function peripheral 30 with reference to FIG. 17. The request handling processing is processing that is executed by the controller 300 when the controller 300 receives the friend request. The controller 300 executes the request handling processing in parallel with the main processing and the answer processing.

First, if receiving the friend request, the controller 300 determines whether to accept the friend request (step S252; Yes→step S254). For example, the controller 300 permits the friend request in the case where the number of the users who are currently the friends is smaller than an upper limit number, which is set in advance.

If accepting the friend request, the controller 300 sends, to the multi-function peripheral 30 that has sent the friend request, information indicating that the friend request is accepted (step S254; Yes→step S256).

In addition, the controller 300 registers the friend for the user who has posted the message including the request (step S258). For example, the controller 300 sends, to the message server 20, the account name of the user who will become friends and the account name of the own peripheral by using the API or the like that is provided by the message server 20.

When receiving information, from the message server 20, indicating that the user who will become friends and the multi-function peripheral 30 (the own peripheral) are associated with each other, the controller 300 posts the message that is addressed to the user (step S260).

If the controller 300 does not accept the friend request in step S254, the controller 300 sends, to the multi-function peripheral 30 that has sent the friend request, information indicating that the friend request is not accepted (denial) (step S254; No→step S262).

2.3.2 Management Server

Figure 18:
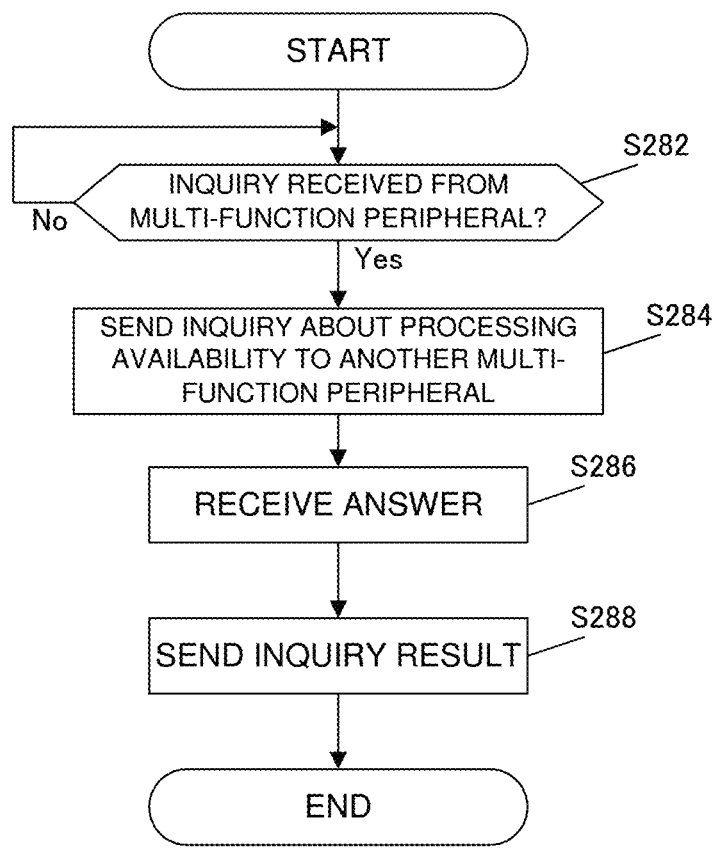
FIG. 18 is a flowchart for illustrating a flow of main processing by management server in the second embodiment.

A description will be made on main processing by the management server 40 with reference to FIG. 18. First, the controller 400 determines whether the inquiry about the multi-function peripheral 30 capable of processing the request is received from the multi-function peripheral 30 under management (step S282).

The controller 400 sends the inquiry about the processing availability that includes the content of the request included in the inquiry received in step S282 to the multi-function peripherals 30 other than the multi-function peripheral 30 (an inquiry source) that has sent the inquiry in step S282. For example, the controller 400 reads address information from the multi-function peripheral data that is stored in the multi-function peripheral data storage area 422, and sends the inquiry about the processing availability to the multi-function peripherals 30 on the basis of the read address information.

Next, the controller 400 receives answers from the multi-function peripherals 30, to which the inquiry about the processing availability has been sent (step S286).

Then, the controller 400 sends a result of the inquiry to the multi-function peripheral 30 (the inquiry source) that has sent the inquiry in step S282 (step S288). The result of the inquiry includes information on the multi-function peripheral 30 that has sent the answer indicating that the request can be processed. The information on the multi-function peripheral 30 may include the name and the account name of the multi-function peripheral 30, and may further include information such as the installed location and the performance, for example. For example, the controller 400 acquires the information on the multi-function peripheral 30 answering in step S286 that the request can be processed by reading such information from the corresponding multi-function peripheral data.

2.4 Operation Example

Figure 19A:
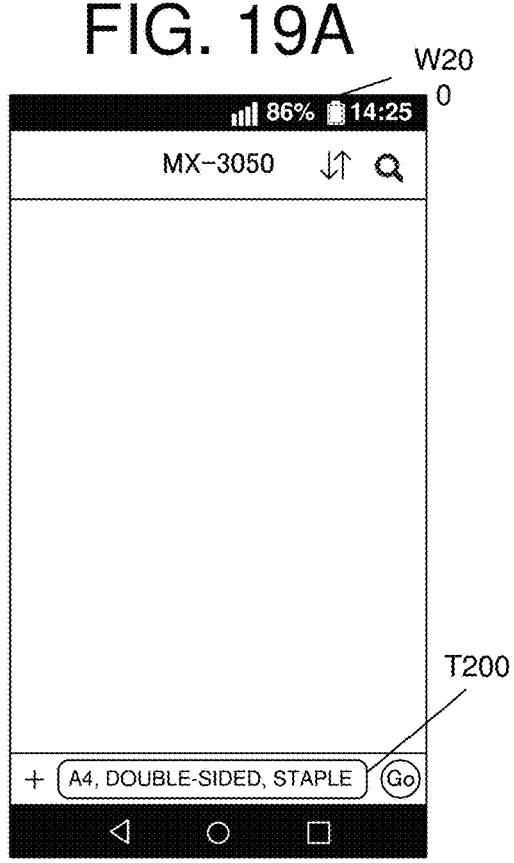
FIGS. 19A to 19D include views for illustrating an operation example in the second embodiment.

A description will be made on an operation example in the present embodiment with reference to FIGS. 19A to 19D. FIG. 19A illustrates an example of a display screen W200 (a talk screen) for exchanging one-to-one messages between the user who uses the terminal device 10 and the friend-registered multi-function peripheral 30 (MX-3050). The user inputs the request such as "A4, DOUBLE-SIDED, STAPLE" in an input field T200 used to input the message.

Figure 19B:
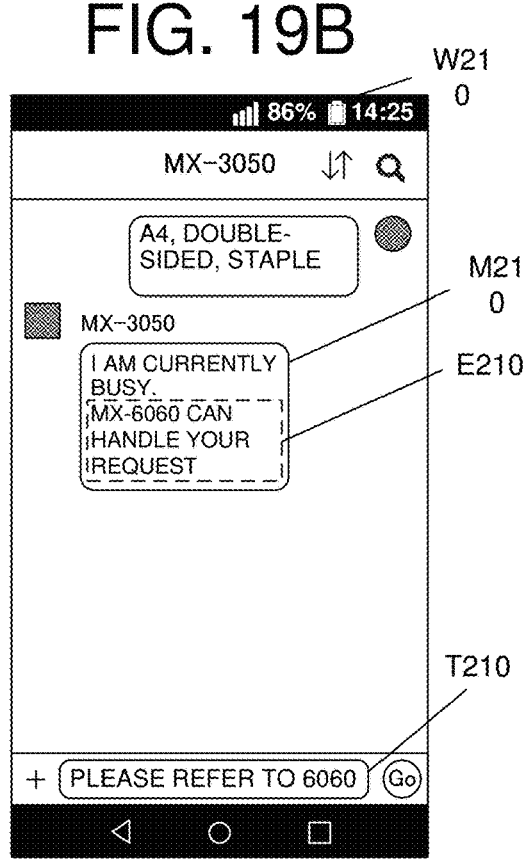

FIG. 19B illustrates an example of a display screen W210 at the time when a message M210 that is posted by the friend-registered multi-function peripheral 30 (MX-3050) is shown in the timeline. In present embodiment, even in the case where the multi-function peripheral 30 (MX-3050) cannot process the user's request, the multi-function peripheral 30 (MX-3050) posts the message M210 that includes information E210 on the multi-function peripheral 30 capable of processing the request. The user can acknowledge the multi-function peripheral 30 capable of processing the request by seeing the information E210.

Furthermore, the user can input and post the message to an input field T210, and the message has an content of referring the multi-function peripheral 30 capable of processing the request. For example, in the case where the multi-function peripheral 30 named MX-6060 can process the user's request, the user can send the referral request of MX-6060 by posting a message such as "PLEASE REFER TO 6060" that includes a part of the name MX-6060.

Figure 19C:
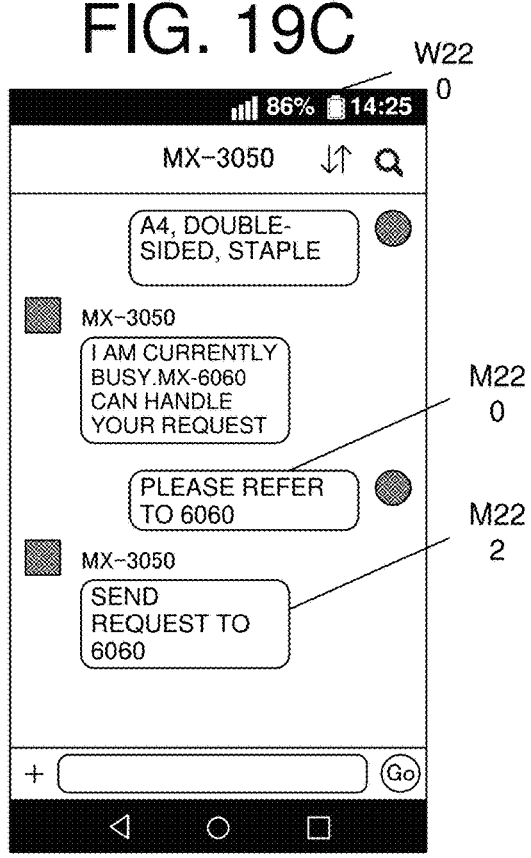

FIG. 19C illustrates an example of a display screen W220 at the time when a message is posted to the display screen W210 illustrated in FIG. 19B. In addition to the message posted by the user, the display screen W220 shows a message M222 that is posted by the multi-function peripheral 30 (MX-3050) that has received the referral request. For example, the message M222 is a message indicating that the friend request is made on the basis of the referral request.

Figure 19D:
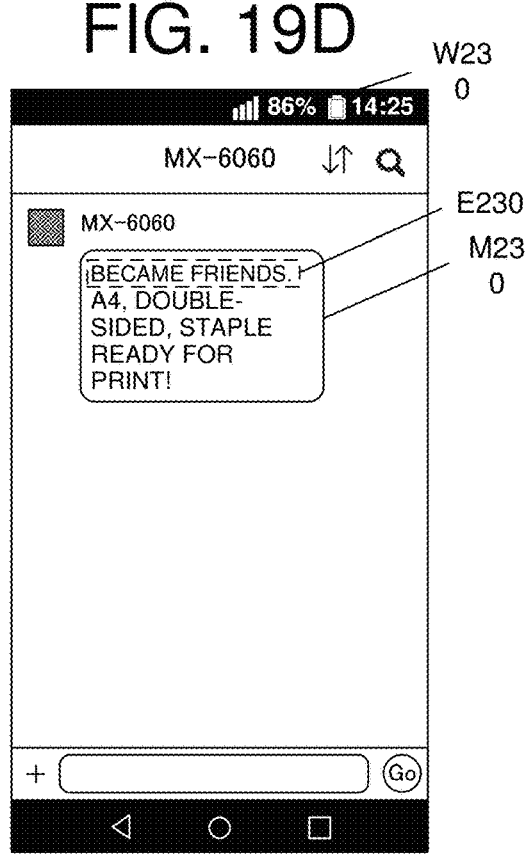

FIG. 19D illustrates an example of a display screen W230 at the time when the multi-function peripheral 30 (MX-6060) capable of processing the user's request posts a message M230 to the user. The message M230 includes information E230 indicating that the multi-function peripheral 30 (MX-6060) has become friends with the user. By checking the information E230, the user can acknowledge that the user has become friends with the multi-function peripheral 30 (MX-6060) capable of processing the user's request. In addition, since the user has become friends with the multi-function peripheral 30 (MX-6060) capable of processing the user's request, the user can directly send the job to the multi-function peripheral 30 by sending the data as the print target.

In the case where the plural multi-function peripherals 30 capable of processing the request are present, the multi-function peripheral 30 of which the user is informed may be determined in consideration of information such as on the high performance (for example, a high-speed peripheral), physical proximity to the user, use frequency by the user, and whether the user is the friend. For example, in the case where information on the other plural multi-function peripherals 30 is acquired in step S212, the controller 300 may acquire the information on the other multi-function peripherals 30 and then may determine the single multi-function peripheral 30. The controller 300 may acquire the information on the other multi-function peripherals 30 from the management server 40 or may acquire such information from the multi-function peripherals 30 with which the controller 300 can communicate. In addition, in the case where the plural multi-function peripherals 30 capable of processing the request are present, the controller 300 may allow the user to select the multi-function peripheral to be used. In this case, the controller 300 lists the names and the like of the multi-function peripherals 30 capable of processing the request, and shows a screen used by the user to select the multi-function peripheral 30. In the case where the user selects the multi-function peripheral 30 via the input section 360, the controller 300 sets the selected multi-function peripheral 30 as a target that is referred to the user in the referral processing in step S214.

If the multi-function peripheral capable of processing the request is not present in step S212, the controller 300 may repeat the processing from step S210 again. In this case, a set value of the number of repetitions for which the inquiry can be made may be stored in each of the multi-function peripherals 30 in order to prevent a waiting time from becoming too long. The controller 300 repeats the processing from step S212 up to the set value.

In addition, in the case where the controller 300 has the function of processing the request but cannot process the request for a reason that the controller 300 currently executes another job in step S248, in addition to the answer that the request cannot be processed, the controller 300 may send, to the management server 40, an expected time until the job can be accepted. In this case, the multi-function peripheral 30 that has sent the inquiry receives, via the management server 40, the information on the multi-function peripheral 30 having the function of processing the request and the expected time until the job can be accepted, generates the message on the basis of the received request, and replies to the user.

Furthermore, in the case where the controller 300 has the function of processing the request but cannot process the request for the reason that the controller 300 currently executes another job in step S248, the controller 300 may allow reservation of the job for processing the user's request after the termination of the other job. For example, in step S248, the controller 300 responds to the management server 40 that the job can be reserved. In this case, the multi-function peripheral 30 that has sent the inquiry acquires information indicating that the job can be reserved in the multi-function peripheral 30 having the function of processing the request via the management server 40, and replies to the user that the job can be reserved. The job may be reserved when the user directly sends the image data or the like to the multi-function peripheral 30 having the function of processing the request, or may be reserved when the user sends the image data to the multi-function peripheral 30 having the function of processing the request via the management server 40.

In the present embodiment, the description has been made that the information on the request is the text data. However, the request may be the data (the job) as the print target. In this case, the user sends the data as the print target to the friend-registered multi-function peripheral 30. In step S206, the multi-function peripheral 30 determines whether the received data as the print target can be processed. If the data cannot be processed, in step S210, the multi-function peripheral 30 sends, to the management server 40, an inquiry that includes information on the required function for processing the data as the print target, and the like. The management server 40 may receive, from the multi-function peripheral 30 under management, the answer of whether the multi-function peripheral 30 has the required function for processing the data as the print target, and may send a result of the answer to the multi-function peripheral 30 as the inquiry source.

In addition, the multi-function peripheral 30 that processes the request by the user may perform the informing operation after executing the processing in step S208 or when receiving the data as the print target (the job) via the application.

According to the present embodiment, even in the case where the multi-function peripheral 30 that is already the friend of the user cannot process the request, the user can acquire the information on the other multi-function peripherals 30 capable of processing the request via the multi-function peripheral 30 that is already the friend of the user. In addition, in the case where the multi-function peripheral 30 that is not the friend can process the request, the user can become friends with the multi-function peripheral 30 capable of processing the request via the multi-function peripheral 30 that is already the friend of the user.

3. Third Embodiment

Next, a description will be made on a third embodiment. Unlike the second embodiment, the third embodiment is an embodiment in which the user is informed of the information on the other multi-function peripheral capable of processing the request without using the management server. In the present embodiment, FIG. 14 in the second embodiment is replaced with FIG. 21, and FIG. 16 in the second embodiment is replaced with FIG. 22. The same functional devices and processing will be denoted by the same reference numerals, and the description thereon will not be made.

3.1. Overall Configuration

An overall configuration of the present embodiment is similar to that of the printing system 1 in the first embodiment, and the terminal device 10, the message server 20, and the multi-function peripherals 30 are connected via the network NW.

Figure 20A:
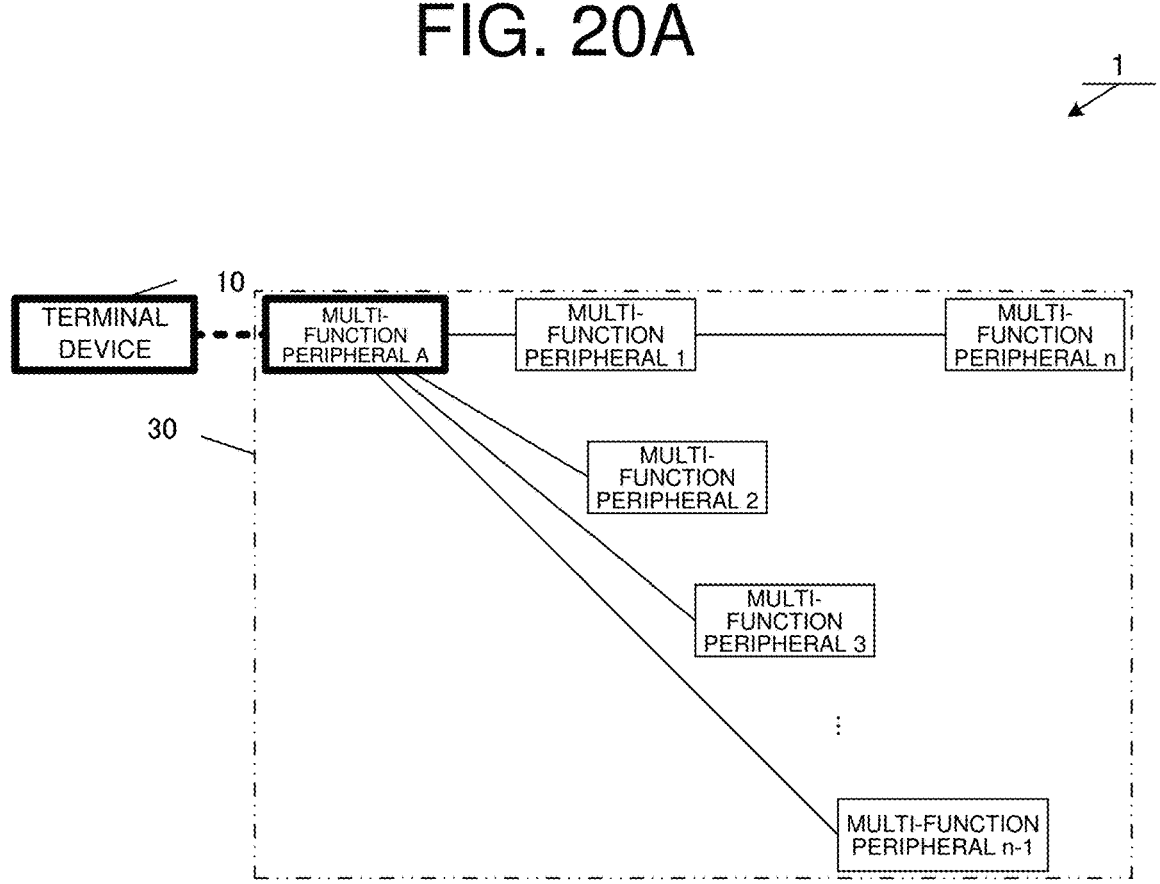
FIGS. 20A to 20B include diagrams for schematically illustrating an overall system in a third embodiment.
Figure 20B:
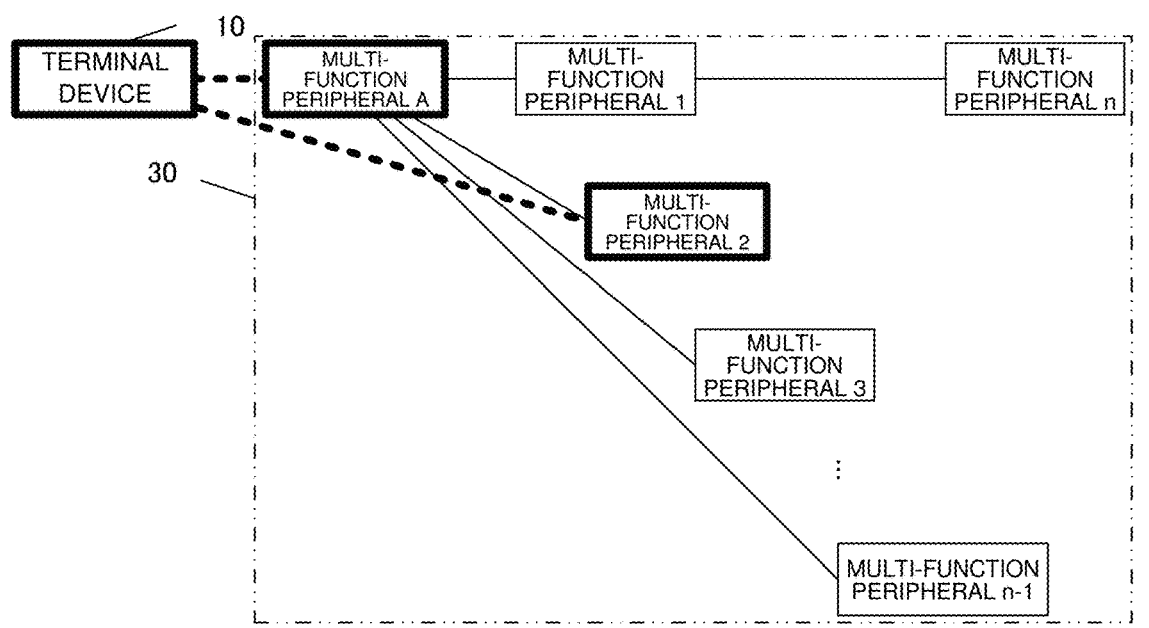

FIGS. 20A to 20B include diagrams schematically illustrating the overall configuration in the present embodiment. Unlike FIGS. 12A to 12B, which schematically illustrates the overall configuration of the second embodiment, the management server 40 does not exist.

FIG. 20A illustrates that the user who uses the terminal device 10 has become friends only with the multi-function peripheral A. The user can post the message including the request with the multi-function peripheral A as the destination.

In the case where the multi-function peripheral A cannot process the user's request, the multi-function peripheral A inquires the other multi-function peripherals 30 in such a relationship that the information can be exchanged about whether the request can be processed. In the case where, as a result of the inquiry, the multi-function peripheral A receives the answer indicating that the request can be processed from the multi-function peripheral 2, the multi-function peripheral A replies to the terminal device 10 with the message including the information on the multi-function peripheral 2.

In addition, similar to the second embodiment, the multi-function peripheral A executing the processing to make the user and the multi-function peripheral 30 capable of processing the request (in this case, the multi-function peripheral 2) friends with each other. FIG. 20B illustrates a case where the user who uses the terminal device 10 has become friends with the multi-function peripheral 2. As a result, the user can send the message to the multi-function peripheral 2.

3.2 Processing Flow

Figure 21:
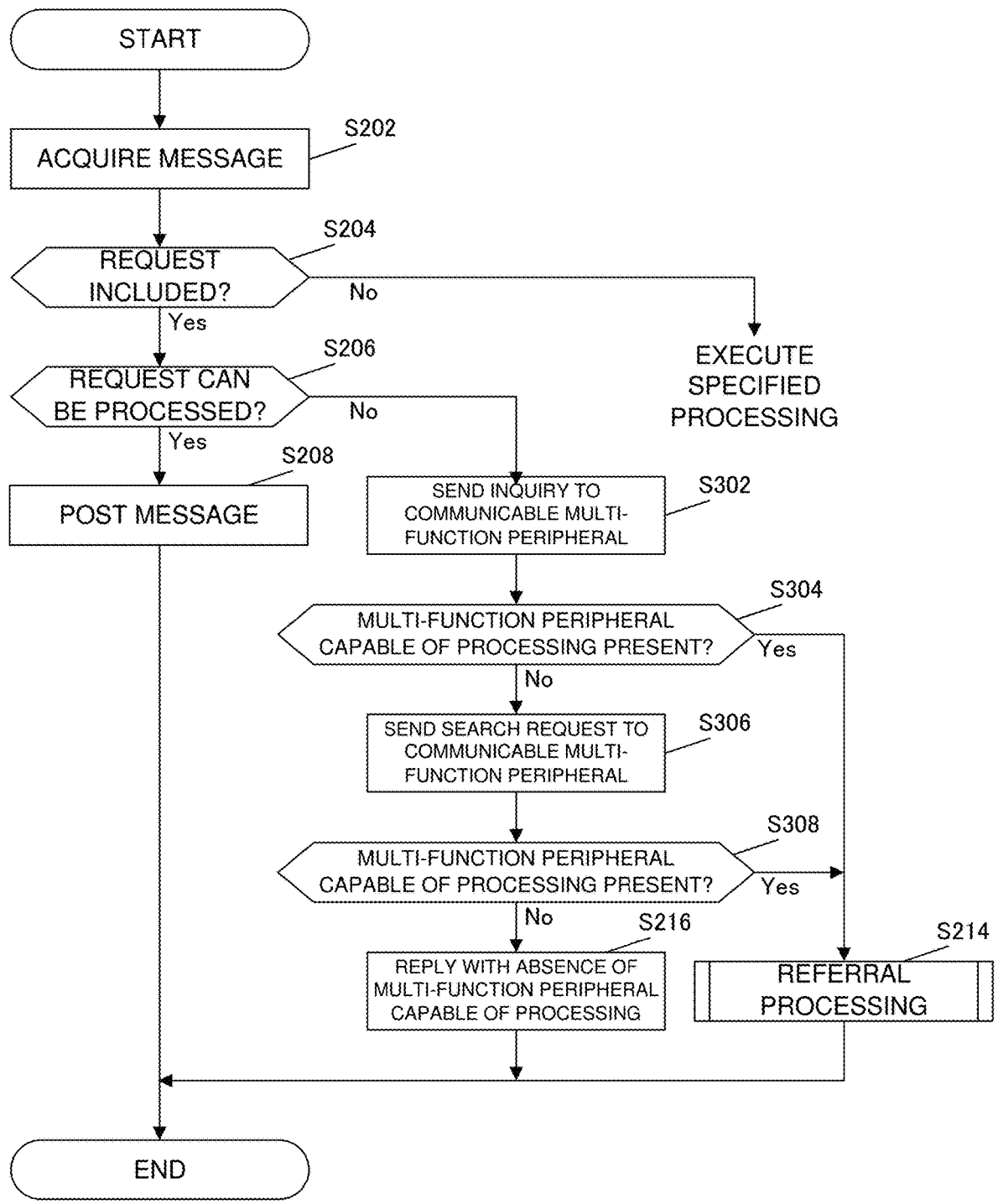
FIG. 21 is a flowchart for illustrating a flow of main processing by a multi-function peripheral in the third embodiment.

A description will be made on a flow of main processing by the multi-function peripheral 30 in the present embodiment with reference to FIG. 21. In the embodiment, if it is determined in step S206 that the request cannot be processed, the controller 300 sends the inquiry about whether the request (the job) can be processed to the communicable multi-function peripheral 30 capable of processing the request (step S302). Based on a result of the inquiry that is sent from the multi-function peripheral 30, the controller 300 determines whether the multi-function peripheral 30 capable of processing the request is present (step S304).

If the multi-function peripheral 30 capable of processing the request is present, the controller 300 executes the referral processing (step S304; Yes→step S214). On the other hand, if the multi-function peripheral 30 capable of processing the request is not present, the controller 300 sends, to the communicable multi-function peripheral 30, a search request for the multi-function peripheral 30 capable of processing the request (step S304; No→step S306). The search request is information that requests the multi-function peripheral 30 as the search request destination to inquire whether the multi-function peripheral 30, with which the multi-function peripheral 30 as the search request destination can communicate, (excluding the multi-function peripheral 30 as the sender of the search request) can process the request. That is, the controller 300 inquires about whether the multi-function peripheral 30, with which the multi-function peripheral 30 (the own peripheral) cannot directly communicate, can process the request via the multi-function peripheral 30, with which the multi-function peripheral 30 (the own peripheral) can communicate.

Next, the controller 300 receives a result of the search request from the other multi-function peripheral 30 that has sent the search request, and determines whether the multi-function peripheral 30 capable of processing the request is present (step S308). The result of the search request includes information on the name of the multi-function peripheral 30 capable of processing the request and the message destination (the account name).

If the multi-function peripheral 30 capable of processing the request is present, the controller 300 executes the referral processing (step S308; Yes→step S214). On the other hand, if the multi-function peripheral 30 capable of processing the request is not present, the controller 300 replies with the message indicating that the multi-function peripheral 30 capable of processing the request is not present (step S308; No→step S216).

Figure 22:
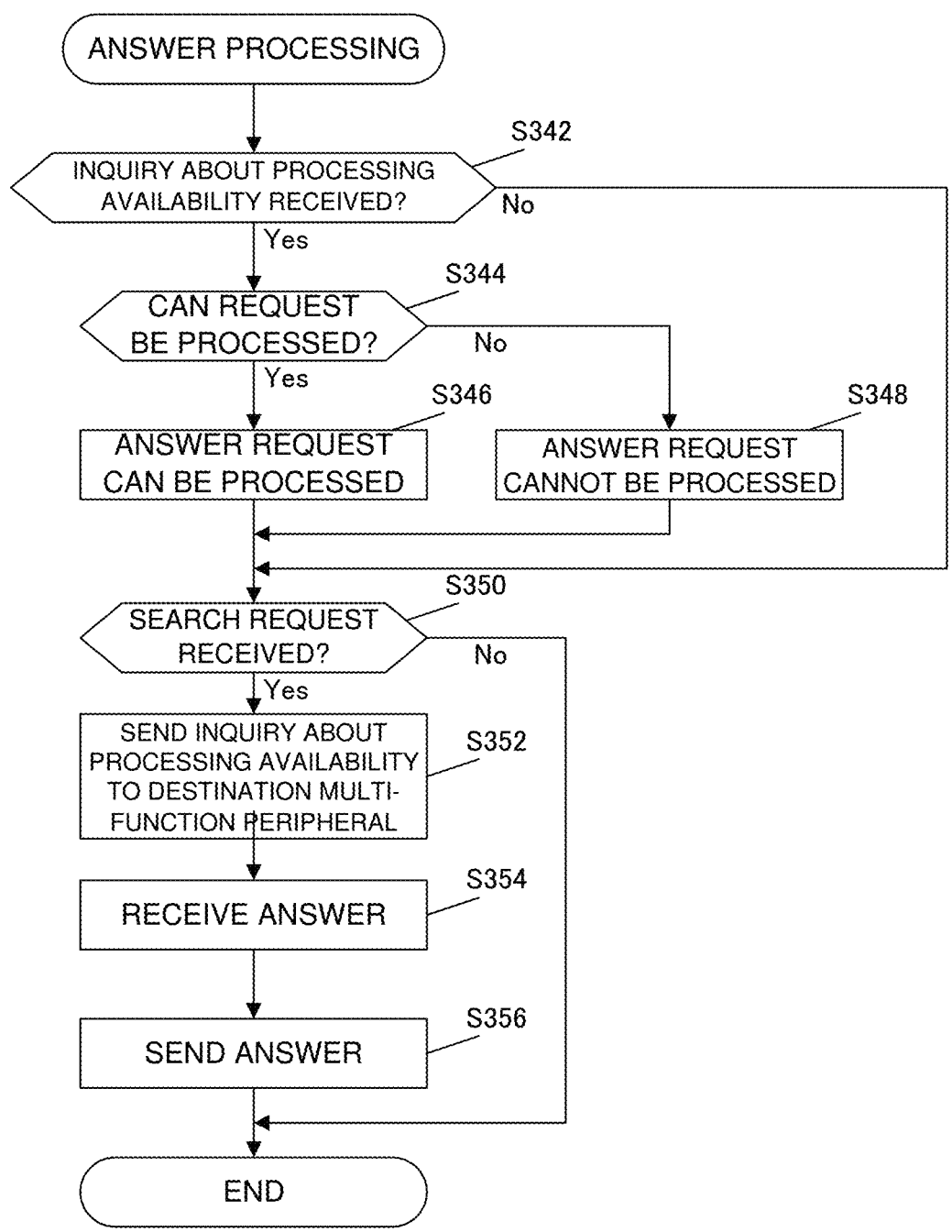
FIG. 22 is a flowchart for illustrating a flow of answer processing in the third embodiment.

Next, a description will be made on answer processing that is executed by the multi-function peripheral 30 with reference to FIG. 22. The answer processing in the present embodiment is processing to handle the inquiry about the processing availability and the search request, which are sent from the communicable multi-function peripheral 30. The controller 300 executes the answer processing in parallel with the main processing.

If the controller 300 receives the inquiry about the processing availability from the other multi-function peripheral 30, the controller 300 determines whether the request that is indicated by the information on the request included in the inquiry about the processing availability can be processed (step S342; Yes→step S344). The processing in step S344 is the same as the processing in step S156 of the main processing.

If the request can be processed, the controller 300 sends, to the multi-function peripheral 30 that has sent the inquiry about the processing availability, the answer indicating that the request can be processed (step S344; Yes→step S346). The controller 300 may send the information on the name and the destination of the own peripheral together with the answer to the multi-function peripheral 30 that has sent the inquiry about the processing availability. If the request cannot be processed, the controller 300 sends, to the multi-function peripheral 30 that has sent the inquiry about the processing availability, the answer indicating that the request cannot be processed (step S344; No→step S348).

Next, if the controller 300 receives the search request from the other multi-function peripheral 30, the controller 300 sends the inquiry about the processing availability to the communicable multi-function peripherals 30 other than the multi-function peripheral 30 that has sent the search request (step S350; Yes→step S352). The controller 300 receives the answers from the multi-function peripherals 30, to which the inquiry about the processing availability has been sent (step S354). The controller 300 sends the answers, which are received in step S354, to the multi-function peripheral 30 that has sent the search request (step S356).

In the case where the search request is sent but the multi-function peripheral capable of processing the request is not present, the controller 300 may cause the multi-function peripheral 30 (a first multi-function peripheral), with which the own peripheral can communicate, to send the search request to the multi-function peripheral 30 (a second multi-function peripheral), with which the first multi-function peripheral can communicate. In this way, the controller 300 can acquire, via the first multi-function peripheral, information on whether the multi-function peripheral 30, with which the second multi-function peripheral can communicate, can process the request. Just as described, the search request may be sent in a chain. Meanwhile, since the number of the multi-function peripherals 30 as the search request destinations is increased in a chain (connection to the multi-function peripheral as the inquiry destination becomes deep), the controller 300 has to wait for a long time until receiving the search result. To prevent such a problem, each of the multi-function peripherals 30 may store information on how deep the search request is sent, that is, a set value indicative of the number of times that the inquiry can be made in the chain. The multi-function peripheral 30 prevents the waiting time from becoming too long by keeping the number of times that the inquiry is sent in the chain within the set value.

In the case where the controller 300 discovers the multi-function peripheral 30, with which the controller 300 cannot communicate directly, as the multi-function peripheral 30 capable of processing the user's request, the controller 300 acquires information (mediation information) on the other multi-function peripherals 30 that have exchanged the search request before the discovery. The controller 300 replies with the name of the multi-function peripheral 30 capable of processing the request. Then, when receiving the referral request from the user (during the initial registration of the multi-function peripheral 30 capable of processing the request), the controller 300 sends the friend request to the multi-function peripheral 30 capable of processing the request via the multi-function peripherals 30 indicated in the mediation information.

According to the present embodiment, it is possible to send to the user the information on the multi-function peripheral capable of processing the user's request without using the management server. Thus, it is possible to simplify the system.

4. Fourth Embodiment

Next, a description will be made on a fourth embodiment. A fourth embodiment is an embodiment in which the terminal device changes a display mode of the information on the friend-registered multi-function peripheral on the basis of the status of the multi-function peripheral.

The status of the multi-function peripheral includes the following information, for example.
(1) A distance between the terminal device 10 and the multi-function peripheral 30
(2) Capability (specifications) of the multi-function peripheral 30
(3) Use frequency of the multi-function peripheral 30
(4) An operation status of the multi-function peripheral 30

A specific description will be made on a method for changing the display mode on the basis of the above-described information.

4.1 Method Based on Distance Between Terminal Device 10 and Multi-Function Peripheral 30

Figure 23:
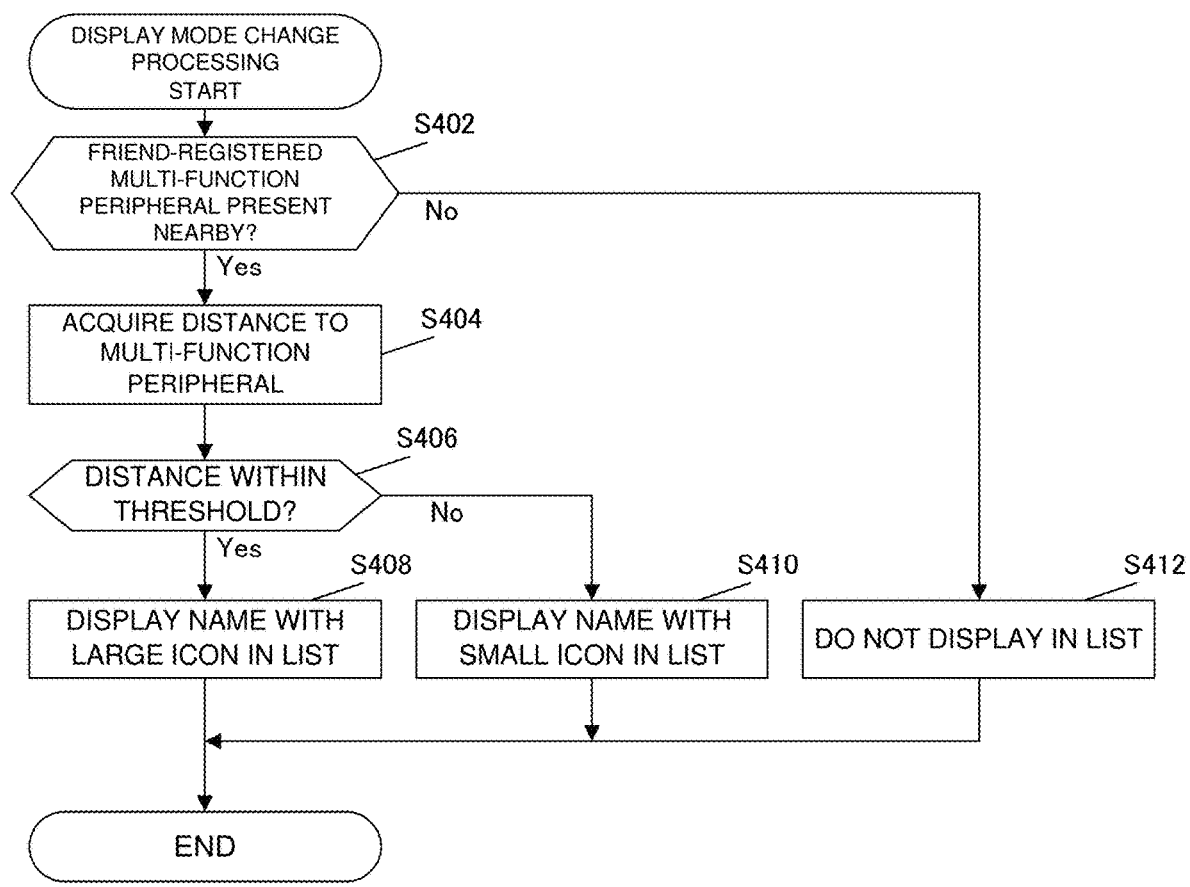
FIG. 23 is a flowchart for illustrating a flow of display mode change processing in a fourth embodiment.

A description will be made on a method for changing the display mode on the basis of the distance between the terminal device 10 and the multi-function peripheral 30 with reference to FIG. 23. FIG. 23 is a chart illustrating a flow of display mode change processing in which items including the information on the friend-registered multi-function peripherals 30 and the icons corresponding to such multi-function peripherals 30 are shown in a list, and in which display modes of the icons are changed. The list may be shown on a screen used to select the friend or the group as the message destination, or may be shown separately from the screen used to select the friend or the group as the message destination.

In addition to the main processing, the controller 100 executes the display mode change processing. In addition, the display mode change processing is executed for each of the friend-registered multi-function peripherals 30.

First, the controller 100 determines whether the friend-registered multi-function peripheral 30 is present nearby (in a specified area) (step S402). For example, the controller 100 determines whether the friend-registered multi-function peripheral 30 is present by any of the following methods.

(1) Method Based on Intensity of Signal Received from Multi-Function Peripheral 30

Each of the terminal device 10 and the multi-function peripheral 30 includes a functional device for wireless communication. For the wireless communication, Bluetooth®, a wireless LAN, Zigbee®, or the like is used. The multi-function peripheral 30 measures the intensity of the signal received from the terminal device 10, and sends a measurement result to the terminal device 10. The controller 100 receives the measurement result from the multi-function peripheral 30. In the case where the intensity of the signal indicated by the measurement result is equal to or higher than a specified value, the controller 100 determines that the friend-registered multi-function peripheral 30 is present nearby.

(2) Method Based on Information Received by Terminal Device 10

The printing system 1 or the printing system 2 includes a location management server that manages: information received by the terminal device 10; and information on a distance between the multi-function peripheral 30 and a location where the information can be received. Examples of the information received by the terminal device 10 are information on a signal that is received from a beacon transmitting a beacon signal and information on an access point of the wireless LAN. The controller 100 sends the received information to the location management server. In the case where any of the multi-function peripherals 30 indicated by the information received from the location management server matches the friend-registered multi-function peripheral 30, the controller 100 determines that the friend-registered multi-function peripheral 30 is present nearby.

If the friend-registered multi-function peripheral 30 is present nearby, the controller 100 acquires a distance to the friend-registered multi-function peripheral 30 on the basis of information on radio wave intensity, the information received from the location management server, and the like (step S402; Yes→step S404).

Next, the controller 100 determines whether the distance, which is acquired in step S404, falls within a threshold (for example, within a radius of 5 m from a location of the terminal device 10) (step S406). If the distance falls within the threshold, the controller 100 shows the name of the multi-function peripheral 30 with a large icon in the list (step S406; Yes→step S408). If the distance exceeds the threshold, the controller 100 shows the name of the multi-function peripheral 30 with a small icon in the list (step S406; No→step S410).

On the other hand, if it is determined in step S402 that the friend-registered multi-function peripheral 30 is not present nearby, the controller 100 does not show the friend-registered multi-function peripheral 30 in the list (step S402; No→step S412).

In this way, the controller 100 can preferentially show the multi-function peripheral 30 that is installed near the user. In addition, even in the case where the preferred multi-function peripheral 30 is changed due to movement of the user, the icon that is assigned to the name of the multi-function peripheral 30 is properly updated. The controller 100 may show the multi-function peripheral 30 whose distance from the terminal device 10 falls within the threshold at the top of the list, which is used to select the message destination, or may prominently show the message, which is posted from such a multi-function peripheral 30, on the talk screen.

4.2. Display Method Based on Capability (Specifications) of Multi-Function Peripheral 30

The controller 100 shows the items including the information on the friend-registered multi-function peripherals 30 and the icons corresponding to the multi-function peripherals 30 in the list, and changes the display modes of the icons on the basis of the capability (the specifications) of the multi-function peripherals 30. The controller 100 acquires information on the function and the capability provided to the multi-function peripheral 30 when becoming friends with the multi-function peripheral 30 or periodically after becoming friends with the multi-function peripheral 30. The information on the function and capability provided to the multi-function peripheral 30 may be acquired from the multi-function peripheral 30, or may be acquired from the management server 40 when the management server 40 is connected to the network NW.

For example, the controller 100 shows the icon, per friend-registered multi-function peripheral 30, according to whether color printing is possible, whether double-sided printing is possible, whether a staple function is available, or the like.

4.3 Display Method Based on Use Frequency of Multi-Function Peripheral 30

The controller 100 shows the items including the information on the friend-registered multi-function peripherals 30 and the icons corresponding to the multi-function peripherals 30 in the list, and changes the display modes of the icons on the basis of the use frequency of the multi-function peripherals 30. The controller 100 periodically acquires information on the use frequency by the user who uses the terminal device 10 from the multi-function peripheral 30 after becoming friends with the multi-function peripheral 30.

For example, for each of the friend-registered multi-function peripherals 30, the controller 100 changes the icon to be shown in the list on the basis of whether the user who uses the terminal device 10 uses the friend-registered multi-function peripheral at least once in a week.

4.4 Display Method Based on Operation Status of Multi-Function Peripheral 30

The controller 100 changes the display mode on the basis of the operation status of the friend-registered multi-function peripheral 30. More specifically, the controller 100 shows the icon representing the multi-function peripheral 30 that is the member of the group on the talk screen of the group. Furthermore, the controller 100 acquires the operation statuses of the multi-function peripherals 30 as the members of the group, and changes appearance of the icon of the multi-function peripheral 30 capable of handling the request by the user from the icon representing the multi-function peripheral 30 that cannot handle the request by the user according to whether the multi-function peripheral 30 operates normally.

For example, the controller 100 shows the icon of the multi-function peripheral 30 that operates normally in color, and shows the icon of the multi-function peripheral 30 that does not operate normally (failure such as the paper jam, running out of a toner, or not being able to communicate normally occurs) in a grayed-out manner.

In addition, on the talk screen of the group, the controller 100 may cause the multi-function peripheral 30 that does not operate normally to temporarily leave (hide from) the group. In this way, the controller 100 can prevent the message, which is posted by the temporarily-left multi-function peripheral 30, from being shown in the timeline.

4.5 Modified Example of Display Method Based on Distance Between Terminal Device 10 and Multi-Function Peripheral 30

The controller 100 shows the icon corresponding to the multi-function peripheral 30 on the talk screen of the group or in the list of the friend-registered multi-function peripherals 30, periodically acquires the distance between the terminal device 10 and the multi-function peripheral 30, and changes the display mode of the icon on the basis of the acquired distance.

For example, the controller 100 illuminates or blinks the icon corresponding to the multi-function peripheral 30 that is installed within a specified distance. In this way, when the user moves while carrying the terminal device 10 by hand and comes close to the friend-registered multi-function peripheral 30, the user can acknowledge presence of the friend-registered multi-function peripheral 30 that is located nearby.

4.6 Operation Example

Figure 24A:
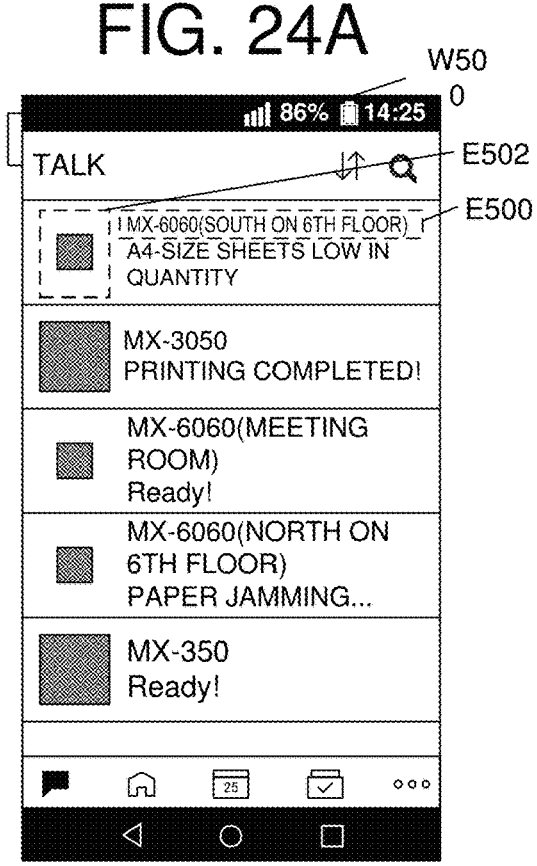
FIGS. 24A to 24D include views for illustrating an operation example in the fourth embodiment.
Figure 24B:
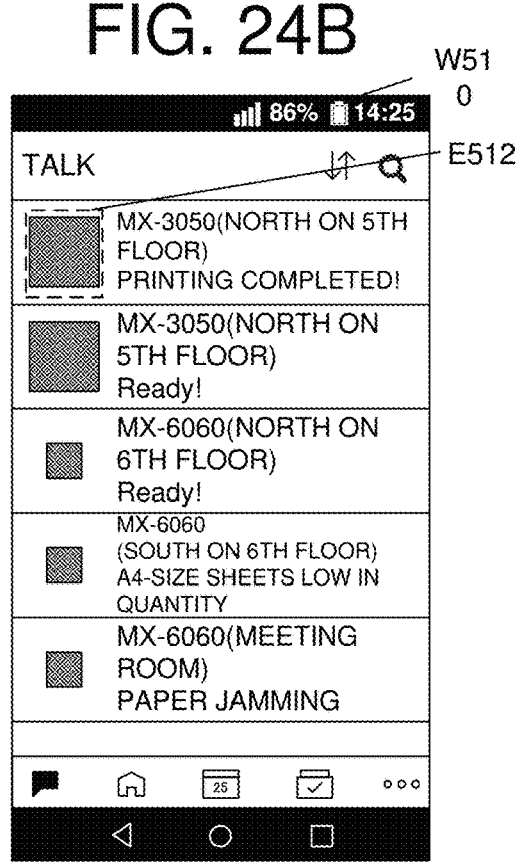

Next, a description will be made on an operation example in the present embodiment. FIG. 24A and FIG. 24B each show a display screen in which the display mode of the list, which is used to select the friend-registered multi-function peripheral 30 as the message destination, is changed on the basis of the distance between the terminal device 10 and the multi-function peripheral 30.

A display screen W500, which is illustrated in FIG. 24A, shows, per the friend-registered multi-function peripheral 30, a list including: an area E500 in which the name of the multi-function peripheral is shown; and an area E502 in which the icon corresponding to such a multi-function peripheral is shown. The icon corresponding to the multi-function peripheral is shown in large size when the multi-function peripheral is located within the threshold (for example, within the radius of 5 m from the location of the terminal device 10), and is shown in small size when the multi-function peripheral is not located within the threshold. For example, on the display screen W500, in regard to the multi-function peripheral 30 named "MX-6060 (SOUTH ON 6TH FLOOR)", it is indicated that, since the icon corresponding to the multi-function peripheral 30 is shown in the small size, the multi-function peripheral is not located within the threshold.

In the case where the user moves while carrying the terminal device 10 by hand and thus the distance between the terminal device 10 and the multi-function peripheral 30 is changed, the display mode of the icon is also changed. For example, the icon that is shown in the small size in the area E502 in FIG. 24A is shown in the large size in an area E512 on a display screen W510 illustrated in FIG. 24B. In this case, it is indicated that the multi-function peripheral 30 named "MX-6060 (SOUTH ON 6TH FLOOR)" exists within the specified threshold. By checking the icons, the user can acknowledge the multi-function peripherals 30 that are located around.

Figure 24C:
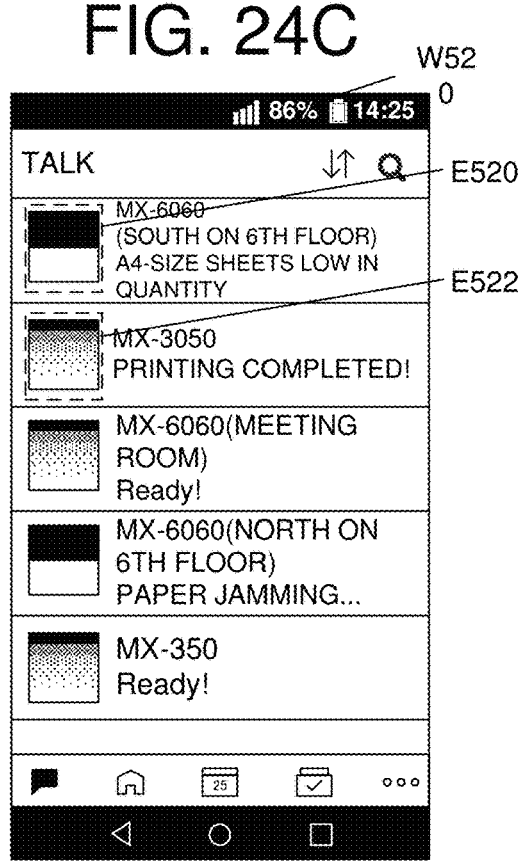

FIG. 24C shows a display screen W520 of a case where the display mode of the list, which is used to select the friend-registered multi-function peripheral 30 as the message destination, is changed on the basis of the specifications and the name of the multi-function peripheral 30. On the display screen W520, in the case where the multi-function peripheral 30 is a monochrome machine, a two-colored black-and-white icon is shown like an icon included in an area E520. In the case where the multi-function peripheral 30 is a color machine, a color icon is shown like an icon included in an area E522. In this way, since the shown icon indicates the capability and the specifications, the user can acknowledge the capability and the specifications of the multi-function peripheral 30 by checking the icon.

Figure 24D:
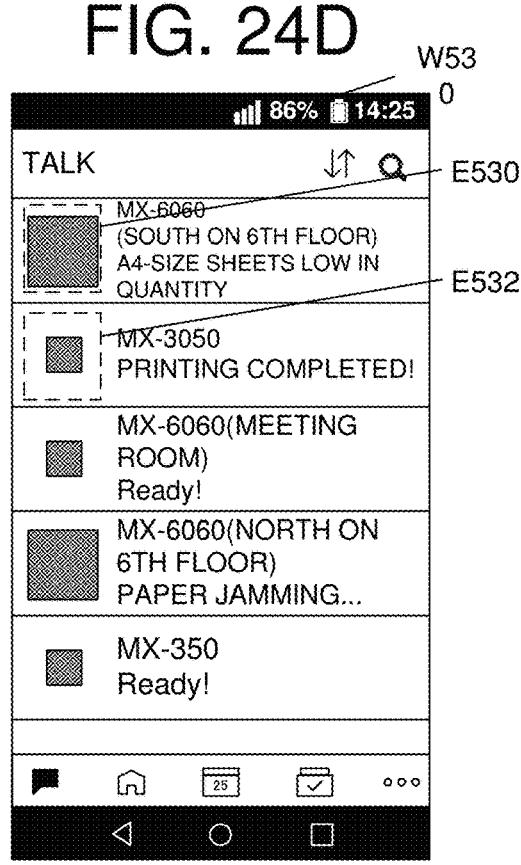

FIG. 24D shows a display screen W530 of a case where the display mode of the list, which is used to select the friend-registered multi-function peripheral 30 as the message destination, is changed on the basis of the use frequency of the multi-function peripheral 30. On the display screen W530, the icon of the multi-function peripheral 30, the use frequency of which is high (for example, used at least once in a week), is shown in the large size like the icon included in an area E530, and the multi-function peripheral 30, the use frequency of which is low, is shown in the small size like the icon included in an area E532. By checking the icon, the user can acknowledge the use frequency of each of the multi-function peripherals 30.

Figure 25A:
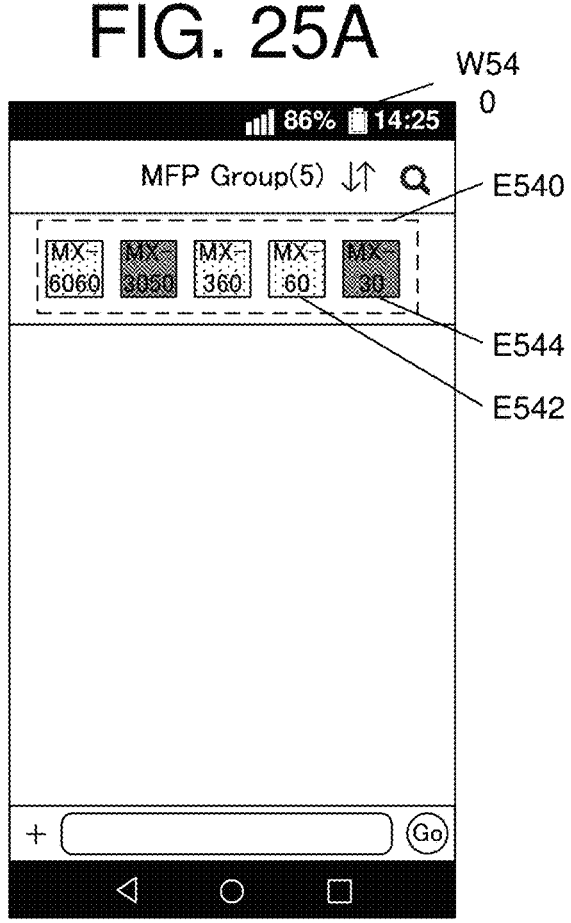
FIGS. 25A to 25B include views for illustrating the operation example in the fourth embodiment.
Figure 25B:
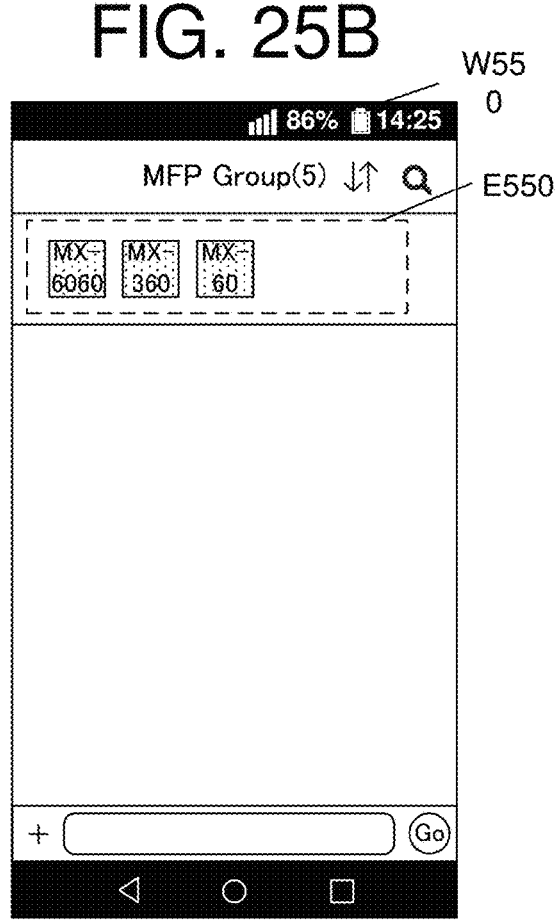

FIGS. 25A to 25B illustrate the display screens of the case where the display mode on the group talk screen is changed on the basis of the statuses of the multi-function peripherals 30. FIG. 25A is an example of a display screen W540 that includes an area E540, in which the icons indicating the multi-function peripherals 30 as the group members are shown, in an upper portion of the group talk screen. The icon of the multi-function peripheral 30 that operates normally is shown in color like an icon E542, and the icon of the multi-function peripheral 30 that does not operate normally (for example, the paper is jammed) is displayed in the grayed-out manner like an icon E544.

FIG. 25B is an example of a display screen W550 of the case where the multi-function peripherals 30 that do not operate normally has temporarily left on a display screen W540 illustrated in FIG. 25A. The message that is posted from one of the temporarily-left multi-function peripherals 30 may not be shown in the timeline. By checking the icons that are shown in the upper portion of the talk screen, the user can acknowledge the multi-function peripherals 30 that operate normally.

FIGS. 26A to 26B show display screens of the case where the display mode of the icon indicating the multi-function peripheral 30 is changed on the basis of the distance between the terminal device 10 and the multi-function peripheral 30. FIG. 26A is an example of a display screen W560 of a case where the icons indicating the multi-function peripherals 30 as the group members are shown on the group talk screen. In this case, when the distance to any of the multi-function peripherals 30 corresponding to the shown icons falls within a specified range, the icon (for example, an icon E560) indicating the multi-function peripheral 30 within the specified range is shown by glowing.

FIG. 26B is an example of a display screen W570 that shows the list, which is used to select the friend-registered multi-function peripheral 30 as the message destination. Also, in this case, when the distance to any of the multi-function peripherals 30 corresponding to the shown icons falls within the specified range, the icon (for example, an icon E570) indicating the multi-function peripheral 30 within the specified range is shown by glowing.

According to the present embodiment, the terminal device 10 changes the display mode on the basis of the information on the friend-registered multi-function peripherals. Thus, the user can easily grasp the location and the status of each of the friend-registered multi-function peripherals by seeing the display.

5. Fifth Embodiment

Next, a description will be made on a fifth embodiment. In the first embodiment to the fourth embodiment, the description has been made that the device that becomes friends with the user who uses the terminal device 10 is the multi-function peripheral. However, such a device may be any other device. In the fifth embodiment, a description will be made on a case where the user registers a device other than the multi-function peripheral as the friend.

In the present embodiment, the device that is registered as the friend by the user only needs be able to execute the processing that has been described in the first embodiment to the fourth embodiment. More specifically, the device that is registered as the friend by the user only needs to include similar functional devices to the controller 300, the message acquirer 302, the message generator 304, and the message poster 306 and to execute the processing illustrated in FIG. 8.

For example, a description will be made on a case where the printing system 1, which has been described in the first embodiment to the fourth embodiment, is applied to a conference system.

In this case, instead of the multi-function peripheral 30 in the printing system 1, for example, a conference information processor (for example, the PC or the like) that is installed in each conference room is connected. The conference information processor is a device that registered as the friend by the user.

The conference information processor acquires, from a system for a server that manages conference reservations, information on a reservation of the conference room in which the own peripheral is installed, information on installed equipment, information on the available functions, and information on the conference room itself (for example, a location, a capacity, and the like).

In addition, in the case where the conference information processor is applied to the conference system, as a request to the conference information processor, the user posts a message that includes information such as time of day to be used, the equipment and the function to be used, the location, and the number of participants. For example, the user posts a message with such a content, "TWO HOURS FROM 1 PM TODAY, VIDEO CONFERENCE FUNCTION, HEADQUARTERS BUILDING, 30 PEOPLE".

In step S154 of the processing illustrated in FIG. 8, in the case where the conference information processor acquires the message that includes the information such as the time of day to be used, the equipment to be used, the location, and the number of participants, the conference information processor determines that the message includes the request.

In addition, in step S156 of the processing illustrated in FIG. 8, the conference information processor determines whether the user's request can be processed. A case where the conference information processor determines that the request can be processed is, for example, a case where the conference room is available at the time specified by the user, the equipment and the function that the user wishes to use are available, and conditions such as the location and the number of participants are satisfied.

The user can acknowledge the conference room that satisfies the request through the message that is posted by the conference information processor.

As another example, a description will be made on a case where the printing system, which has been described in the first embodiment to the fourth embodiment, is applied to a storage service. In this case, instead of the multi-function peripheral 30 in the printing system 1, storage equipment (for example, a network-attached storage (NAS) or a storage server) is connected. The storage equipment is a device that registered as the friend by the user.

The storage equipment manages information on the user or the like who can use the equipment and information such as storage capacity (for example, a free space or an upper limit value of the storage capacity that is allocated per user) and usage.

In the case where the storage equipment is applied to the storage service, as a request to the storage equipment, the user posts a message that includes information such as capacity of the data to be stored and the usage. For example, the user posts a message with such a content, "1 GB, for saving conference materials".

In step S154 of the processing illustrated in FIG. 8, in the case where the storage equipment acquires the message that includes the information such as the capacity of the data and the usage, the storage equipment determines that the message includes the request.

In addition, in step S156 of the processing illustrated in FIG. 8, the storage equipment determines whether the user's request can be processed. A case where the storage equipment determines that the request can be processed is a case where the user can use the storage equipment, the capacity of the data that is specified by the user is available to the user, and the usage matches.

The user can acknowledge the storage equipment that satisfies the request through the message that is posted by the storage equipment.

Just as described, in the case where the terminal device 10 and the device that is registered as the friend by the user can exchange the messages via the SNS, the present invention can also be applied to a system other than the conference system and the storage service that have been described in the fifth embodiment.

According to the present embodiment, even when the user does not understand the functions provided by each of the devices in the system to be used, the user can find the device capable of processing the request by posting the message including the request.

6. Modified Embodiments

The present invention is not limited to each of the above-described embodiments, and various modifications can be made thereto. That is, an embodiment that is obtained by combining technical means that are appropriately modified within the scope that does not depart from the gist of the present invention is also included in the technical scope of the present invention.

In addition, the above-described embodiments have parts that are described separately for convenience of the description. However, it is needless to say that the embodiments may be combined and implemented within the technically possible range.

The program that is run in each of the devices in the embodiments is a program that controls the CPU and the like (for example, a program that makes a computer function) to exert the functions in the above-described embodiments. In addition, the information that is handled by these devices is temporarily stored in a temporary storage device (for example, RAM) at the time of processing, and is thereafter stored in a storage device such as any of various types of read only memory (ROM) or the HDD. Then, such information is read, corrected, or written by the CPU when necessary.

Here, the recording medium that stores the program may be a semiconductor medium (for example, the ROM, a non-volatile memory card, or the like), an optical recording medium/a magneto-optical recording medium (for example, a Digital Versatile Disc (DVD), a Magneto Optical Disc (MO), a Mini Disc (MD), a Compact Disc (CD), a Blu-ray® Disk (BD), or the like), a magnetic recording medium (for example, a magnetic tape, a flexible disk, or the like), or the like. In addition, there is a case where not only the functions in the above-described embodiments are exerted by running the loaded program but also the functions in the present invention are exerted by means of cooperate processing with an operating system, another application program, or the like on the basis of a command of the program.

Furthermore, in the case where the program is distributed to the market, the program can be stored in a portable recording medium for the distribution, or can be transferred to a server computer that is connected via a network such as the Internet. In this case, it is needless to say that a storage device in the server computer is also included in the present invention.

What is claimed is:

1. An information processing apparatus comprising:
a processor; and
a display, wherein
the processor is configured to:
receive a posting of a first message including a request by a user;
post the first message to a social networking service (SNS);
acquire a second message posted by an image forming device from the SNS, the image forming device being able to process the request and being among image forming devices that are associated with the user in the SNS;
show, on the display, the second message;
show, in a list on the display, items that include: information on the image forming device that is associated with the user; and an icon that corresponds to the image forming device that is associated with the user;
change a display mode of the icon on the basis of a status of the image forming device that is associated with the user, the status being a distance to the image forming device that is associated with the user; and
change the display mode of the icon on the basis of the distance to the image forming device that is associated with the user.

2. The information processing apparatus according to claim 1, wherein the processor does not show, in the list, an item of the image forming device that is associated with the user when the image forming device that is associated with the user is not in a specified area.

3. An information processing apparatus comprising:
a processor; and
a display, wherein
the processor is configured to:
receive a posting of a first message including a request by a user, the first message being addressed to a specified image forming device among image forming devices that are associated with the user in a social networking service (SNS);
post the first message, which is addressed to the specified image forming device, to the SNS;
acquire a second message posted by the specified image forming device from the SNS, the second message indicating the image forming device is capable of processing the request; and
show, on the display, the second message;
show, in a list on the display, items that include: information on the image forming device that is associated with the user; and an icon that corresponds to the image forming device that is associated with the user;
change a display mode of the icon on the basis of a status of the image forming device that is associated with the user, the status being a distance to the image forming device that is associated with the user; and
change the display mode of the icon on the basis of the distance to the image forming device that is associated with the user.

4. The information processing apparatus according to claim 3, wherein the processor is further configured to:
receive posting of a third message that includes another request to allow posting of yet another message addressed to the image forming device capable of processing the request; and
post the third message to the specified image forming device as a destination.

5. The information processing apparatus according to claim 3, wherein the processor does not show, in the list, an item of the image forming device that is associated with the user when the image forming device that is associated with the user is not in a specified area.

6. A control method of an information processing apparatus comprising:
receiving a posting of a first message including a request by a user;
posting the received message to a social networking service (SNS);
acquiring a second message posted by an image forming device from the SNS, the image forming device being able to process the request and being among image forming devices that are associated with the user in the SNS;

showing the acquired second message;

showing, in a list, items that include: information on the image forming device that is associated with the user; and an icon that corresponds to the image forming device that is associated with the user;

changing a display mode of the icon on the basis of a status of the image forming device that is associated with the user, the status being a distance to the image forming device that is associated with the user; and change the display mode of the icon on the basis of the distance to the image forming device that is associated with the user.

7. A control method of an information processing apparatus comprising:

receiving a posting of a first message including a request by a user, the first message being addressed to a specified image forming device among image forming devices that are associated with the user in a social networking service (SNS);

posting the first received message, which is addressed to the specified image forming device, to the SNS;

acquiring a second message posted by the specified image forming device from the SNS, the message indicating the image forming device is capable of processing the request;

showing the acquired second message;

showing, in a list, items that include: information on the image forming device that is associated with the user; and an icon that corresponds to the image forming device that is associated with the user;

changing a display mode of the icon on the basis of a status of the image forming device that is associated with the user, the status being a distance to the image forming device that is associated with the user; and change the display mode of the icon on the basis of the distance to the image forming device that is associated with the user.

* * * * *